US011951598B2

(12) United States Patent
Krzyzanski et al.

(10) Patent No.: US 11,951,598 B2
(45) Date of Patent: Apr. 9, 2024

(54) TOOL FOR DISASSEMBLING CONNECTORS

(71) Applicant: Oetiker Tool Corporation, Branford, CT (US)

(72) Inventors: Joseph Krzyzanski, New Haven, CT (US); Ryan Adams, Cheshire, CT (US); Scott Wetzel, Milford, CT (US)

(73) Assignee: Oetiker Tool Corporation, Branford, CT (US)

( * ) Notice: Subject to any disclaimer, the term of this patent is extended or adjusted under 35 U.S.C. 154(b) by 108 days.

(21) Appl. No.: 17/441,998

(22) PCT Filed: Mar. 25, 2020

(86) PCT No.: PCT/US2020/024630
§ 371 (c)(1),
(2) Date: Sep. 22, 2021

(87) PCT Pub. No.: WO2020/210029
PCT Pub. Date: Oct. 15, 2020

(65) Prior Publication Data
US 2022/0168876 A1 Jun. 2, 2022

Related U.S. Application Data

(60) Provisional application No. 62/833,184, filed on Apr. 12, 2019.

(51) Int. Cl.
*B25B 27/10* (2006.01)

(52) U.S. Cl.
CPC .................................... *B25B 27/10* (2013.01)

(58) Field of Classification Search
CPC ...................................................... B25B 27/10
See application file for complete search history.

(56) References Cited

U.S. PATENT DOCUMENTS 483,869 A 10/1892 Randle
854,433 A 5/1907 Rowan
(Continued)

FOREIGN PATENT DOCUMENTS

CN 104203507 A 12/2014
CN 107848128 A 3/2018
(Continued)

OTHER PUBLICATIONS

International Search Report and Written Opinion for International Application No. PCT/US2020/24630 dated Jun. 19, 2020, 9pgs.
(Continued)

*Primary Examiner* — Nirvana Deonauth
(74) *Attorney, Agent, or Firm* — McCarter & English, LLP; Dave S. Christensen

(57) ABSTRACT

A tool for disassembling a pipe or tube from a push-to-connect fitting and a method is provided. The tool includes a first body and a second body pivotally coupled to the first body. A pair of first fingers are pivotally coupled to the first body, each of the first fingers having a first semi-circular surface, the first semi-circular surfaces cooperating to engage the pipe or tube adjacent the collar. A pair of second fingers are coupled to the second body, each of the second fingers having a second semicircular surface, the second semi-circular surfaces cooperating to engage the push-to-connect fitting. Wherein with the first body is rotated from a first position to a second position, the pair of first fingers moves a fitting collar axially relative to the pipe or tube.

15 Claims, 23 Drawing Sheets

(56) References Cited

U.S. PATENT DOCUMENTS

| | | | | |
|---|---|---|---|---|
| 975,385 | A | 11/1910 | Chappel | |
| 3,845,538 | A * | 11/1974 | Demler, Sr. | B25B 27/16 81/421 |
| 4,459,717 | A | 7/1984 | Halstead | |
| 4,569,132 | A | 2/1986 | Hill | |
| 4,757,588 | A | 7/1988 | Churchich | |
| 5,537,727 | A | 7/1996 | Mayer | |
| 6,116,118 | A | 9/2000 | Wesch, Jr. | |
| 8,424,179 | B2 | 4/2013 | Webb et al. | |
| 8,978,226 | B2 | 3/2015 | Kady et al. | |
| 2008/0314205 | A1 * | 12/2008 | Feliciano | B25B 27/10 81/426 |
| 2013/0000051 | A1 | 1/2013 | Cleland | |
| 2015/0111475 | A1 | 4/2015 | Raczuk | |
| 2016/0023331 | A1 | 1/2016 | Chen | |
| 2018/0264634 | A1 | 9/2018 | Yontz et al. | |

FOREIGN PATENT DOCUMENTS

| | | | |
|---|---|---|---|
| CN | 207983415 | U | 10/2018 |
| CN | 110087835 | A | 8/2019 |
| DE | 4412813 | A1 | 10/1995 |
| TW | I645948 | B | 1/2019 |

OTHER PUBLICATIONS

Australian Examination Report for Australian Application 2020272576; dated Sep. 2, 2022 (pp. 1-4).

Chinese Office Action for Chinese Application No. 202080028287.2, dated Jul. 29, 2022 (pp. 1-10).

European Search Report for European Application No. 20788655.7, dated Dec. 8, 2022 (pp. 1-8).

Chinese Office Action for Application No. 202080028287.2, dated Jan. 5, 2023, 15 pages.

* cited by examiner

TOOL FOR DISASSEMBLING CONNECTORS

CROSS REFERENCE TO RELATED APPLICATIONS

This application claims the benefit of U.S. application Ser. No. 62/833,184, filed on Apr. 12, 2019, which is incorporated herein by reference in its entirety.

BACKGROUND

The subject matter disclosed herein relates to a hand tool, and in particular to a hand tool for disassembling a tube from a push-to-connect fittings that couple tubing and piping used in plumbing and other applications.

Traditionally, pipes used in plumbing were made from a metal, such as copper for example. To connect different sections of pipe, a fitting was used (e.g. an elbow). To seal the pipe to the fitting, an operation is performed involving a heat source, such as a torch for example, and the joint was sealed with a soldering material (e.g. an alloy of silver and copper or silver and zinc). It should be appreciated that the soldering operation was time consuming, required a level of skill to avoid leaks, and could be difficult depending on the location of the joint. Further, metal pipes are rigid, which restricts the routing of the pipes to reduce or minimize joints.

To alleviate some of these issues, cross-linked polyethylene ("PEX") tubing was developed to transfer fluid between locations. PEX tubing provides many advantages as its inherent flexibility allows for installations that would be difficult or impossible with traditional tubing materials, such as copper. Where an installation uses a joint, such as a t-joint for example, or multiple tube are connected, a fitting is used. Typically, the PEX tube is installed over the outer diameter of the fitting and a clamp is installed over the tube. The clamp secures the tube on the fitting.

To further simplify the connection of pipes, or the connection of pipes/tubing of different material another type of fitting is sometimes referred to as a push-to-connect fitting was developed. Push-to-connect fittings are commercially available under the trade name SharkBite manufactured by SharkBite US, of Atlanta Georgia for example. Unlike traditional plumbing fittings which required soldering or clamps, a push-to-connect fitting allows the installer to simply push the end of the pipe or tubing into the push-to-connect fitting. The fitting seals against the pipe and includes features to lock the pipe/tube and fitting together.

Accordingly, while existing push-to-connect fittings are suitable for their intended purposes the need for improvement remains, particularly in providing a tool that includes the features and advantages described herein.

BRIEF DESCRIPTION

According to one aspect of the disclosure a tool for disassembling a pipe or tube from a push-to-connect fitting is provided. The push-to-connect fitting having a collar arranged to engage the pipe or tube. The tool includes a first body and a second body pivotally coupled to the first body. A pair of first fingers are pivotally coupled to the first body, each of the first fingers having a first semi-circular surface, the first semi-circular surfaces cooperating to engage the pipe or tube adjacent the collar. A pair of second fingers are coupled to the second body, each of the second fingers having a second semicircular surface, the second semi-circular surfaces cooperating to engage the push-to-connect fitting. Wherein with the first body is rotated from a first position to a second position, the pair of first fingers moves the collar axially relative to the pipe or tube.

In this and other embodiments, the tool further comprises a latch member pivotally coupled to one of the first body or second body, the latch member having a first engagement surface and a second engagement surface, the latch member being movable to selectively engage the first engagement surface or second engagement surface. In this and other embodiments, the pair of first fingers are coupled by a first biasing member, the first biasing member biasing the first semi-circular surfaces toward each other. In this and other embodiments, the pair of second fingers are coupled by a second biasing member, the second biasing member biasing the second semi-circular surfaces toward each other.

In this and other embodiments, the tool further comprises a first handle coupled to the first body and a second handle coupled to the second body. In this and other embodiments, each of the second semi-circular surfaces includes a slot extending therefrom, the slots being arranged on opposite each other. In this and other embodiments, the first body includes a third semi-circular surface, the third semi-circular surface being adjacent to and perpendicular to the first semi-circular surfaces. In this and other embodiments, the second body includes a fourth semi-circular surface, the fourth semi-circular surface being adjacent to and perpendicular to the second semi-circular surfaces.

In accordance with another embodiment, a method of disassembling a pipe or tube from a push-to-connect fitting is provided. The push to connect fitting having a collar arranged to engage the pipe or tube. The method includes moving a tool to a first position, the tool having a first body, a second body pivotally coupled to the first body, a pair of first fingers coupled to the first body and a pair of second fingers coupled to the second body. The pair of first fingers are engaged with the pipe or tube. The second pair of fingers are engaged with the fitting. The first body pivots relative to the second body to engage the collar with the first fingers. The first body pivots relative to the second body to slide the collar axially into the fitting. The pipe or tube is removed from the fitting when the collar is slide axially into the fitting.

In this or other embodiments, the method further comprises biasing the first fingers against the pipe or tube, and biasing the second fingers against the fitting. In this or other embodiments, the method further comprises fixing the position of the first body relative to the second body prior to removing the pipe or tube from the fitting. In this or other embodiments, the fixing of the position is provided by a latching member pivotally coupled to the second body.

In this or other embodiments, the latching member includes a first engagement surface and a second engagement surface. In this or other embodiments, the method further comprises pivoting the latch member to operably engage the first engagement surface with the first body when a first fitting is coupled to the pipe or tube, and pivoting the latch member to operably engage the second engagement surface with the first body when a second fitting is coupled to the pipe or tube, the first fitting being a different size than the second fitting.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
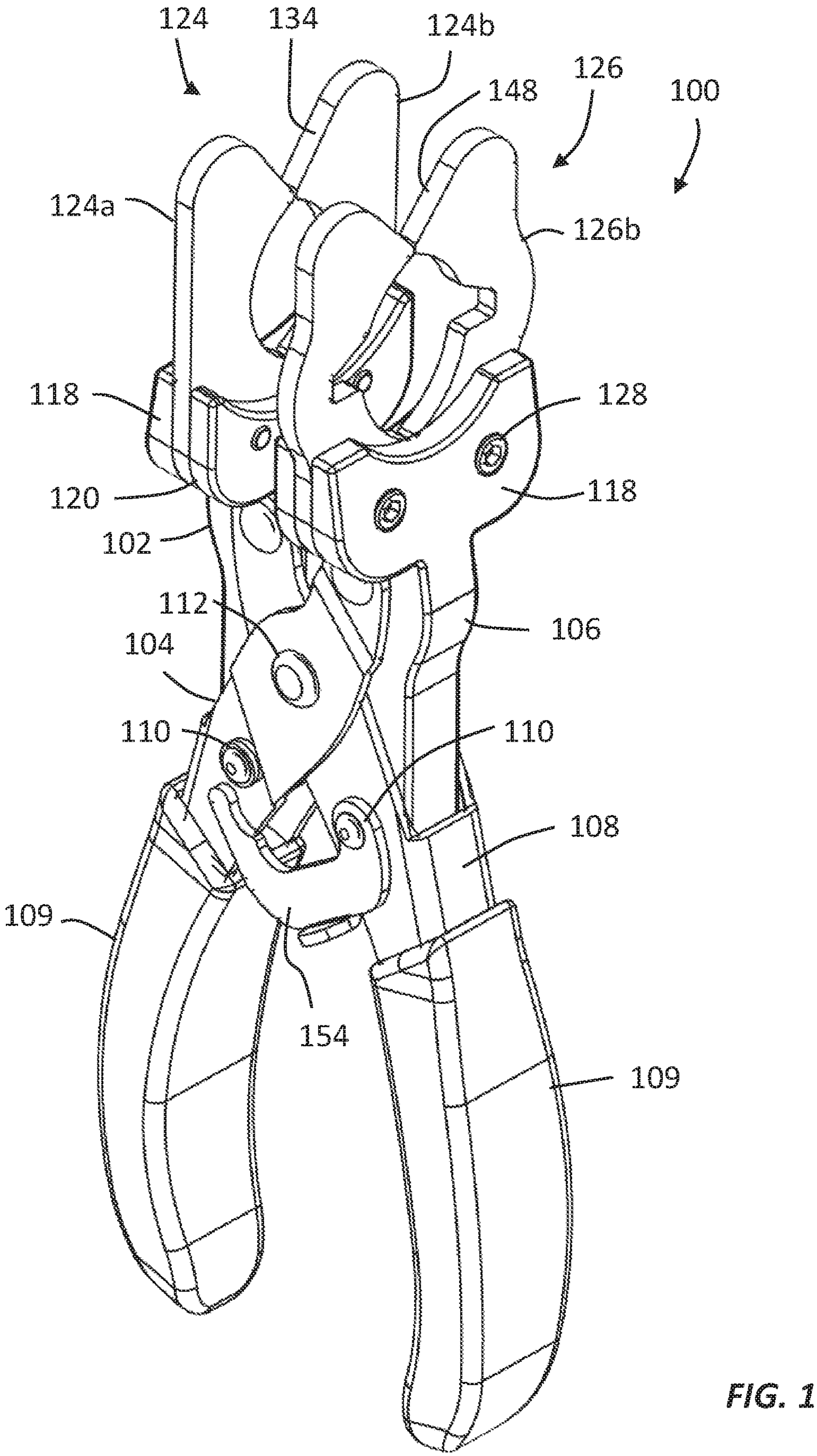
FIG. 1 is a perspective view of a tool in a first position for disassembly a pipe or tube from a push-to-connect fitting in accordance with an embodiment.
Figure 2:
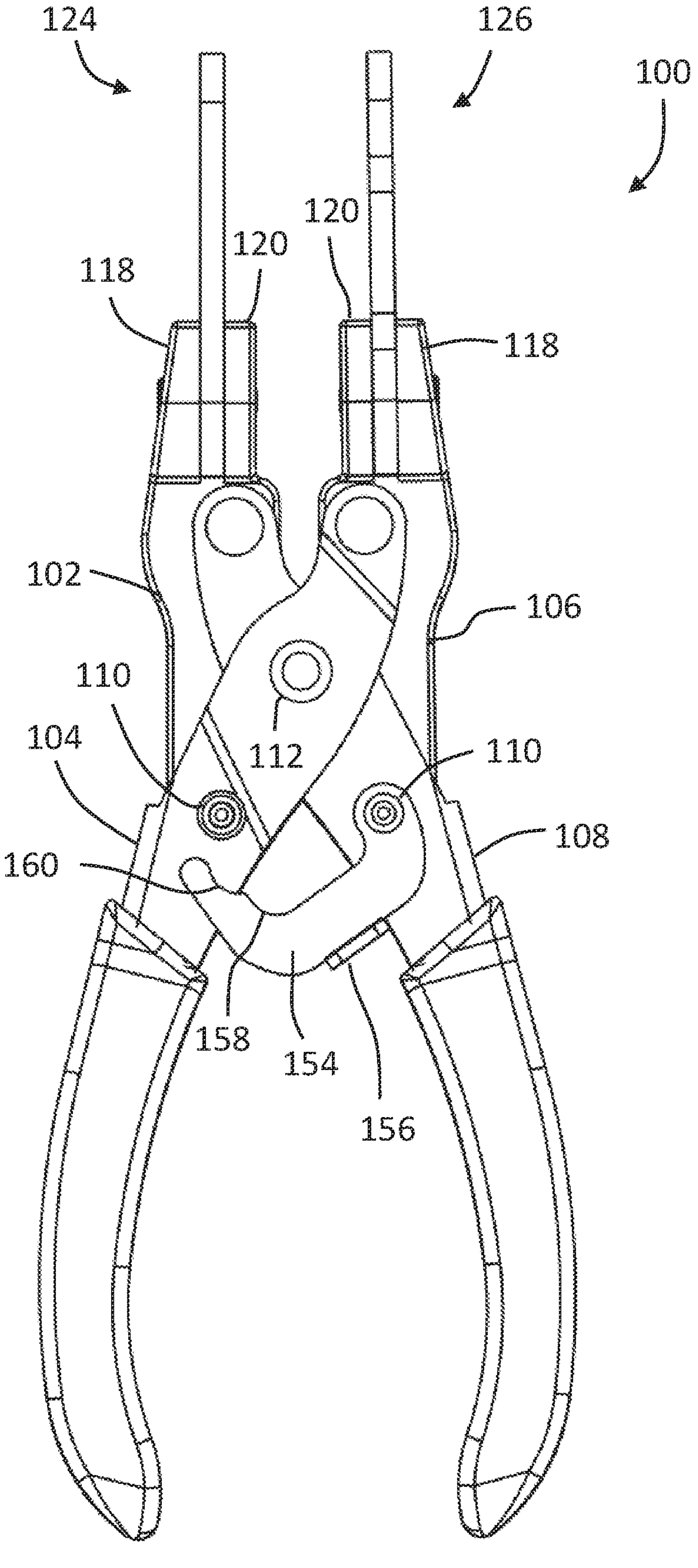
FIG. 2 is a first side view of the tool of FIG. 1.
Figure 3:
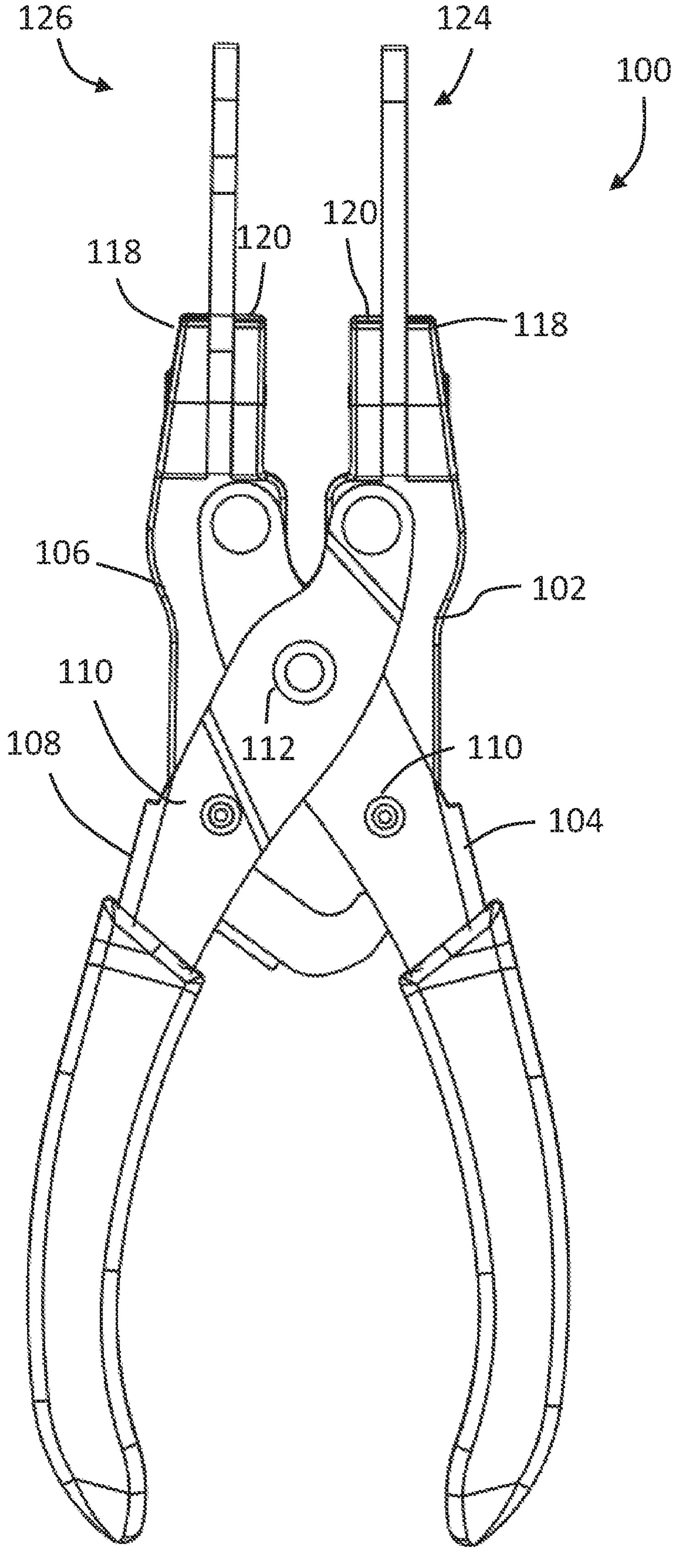
FIG. 3 is a second side view of the tool of FIG. 1.
Figure 4:
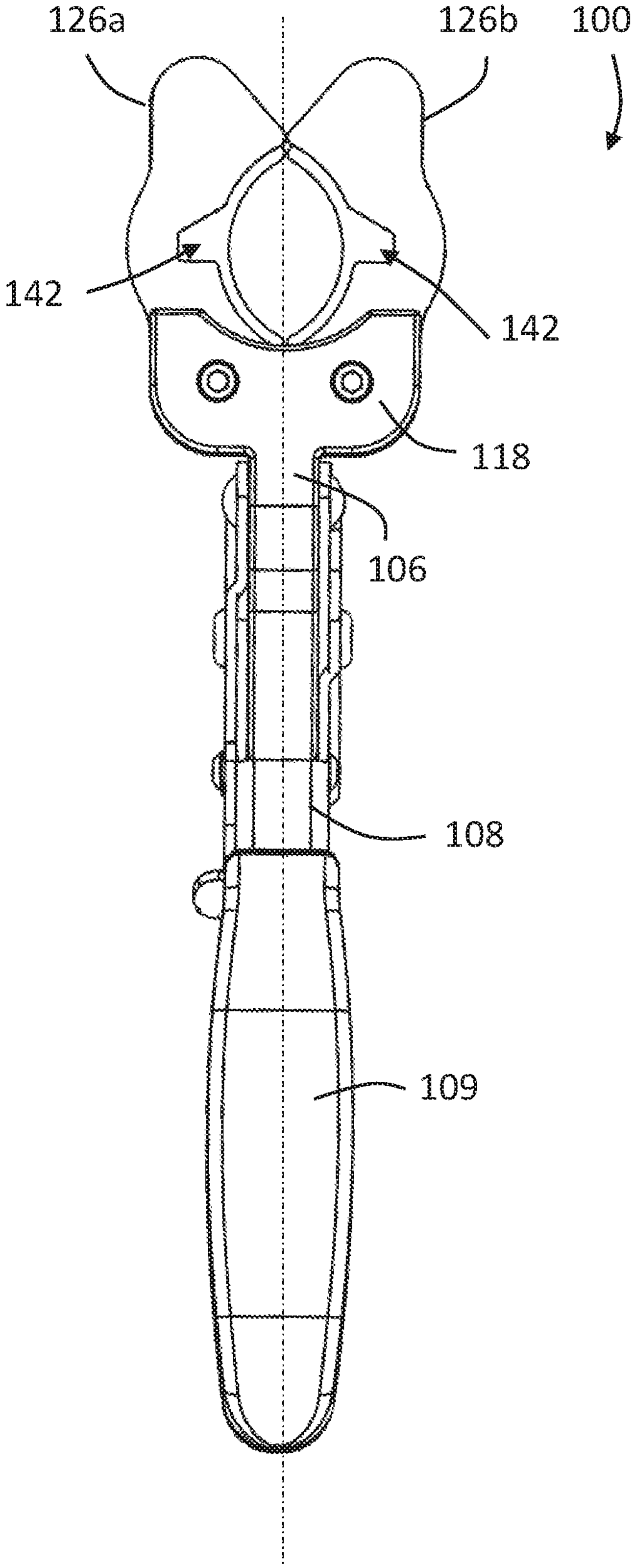
FIG. 4 is a first end view of the tool of FIG. 1.
Figure 5:
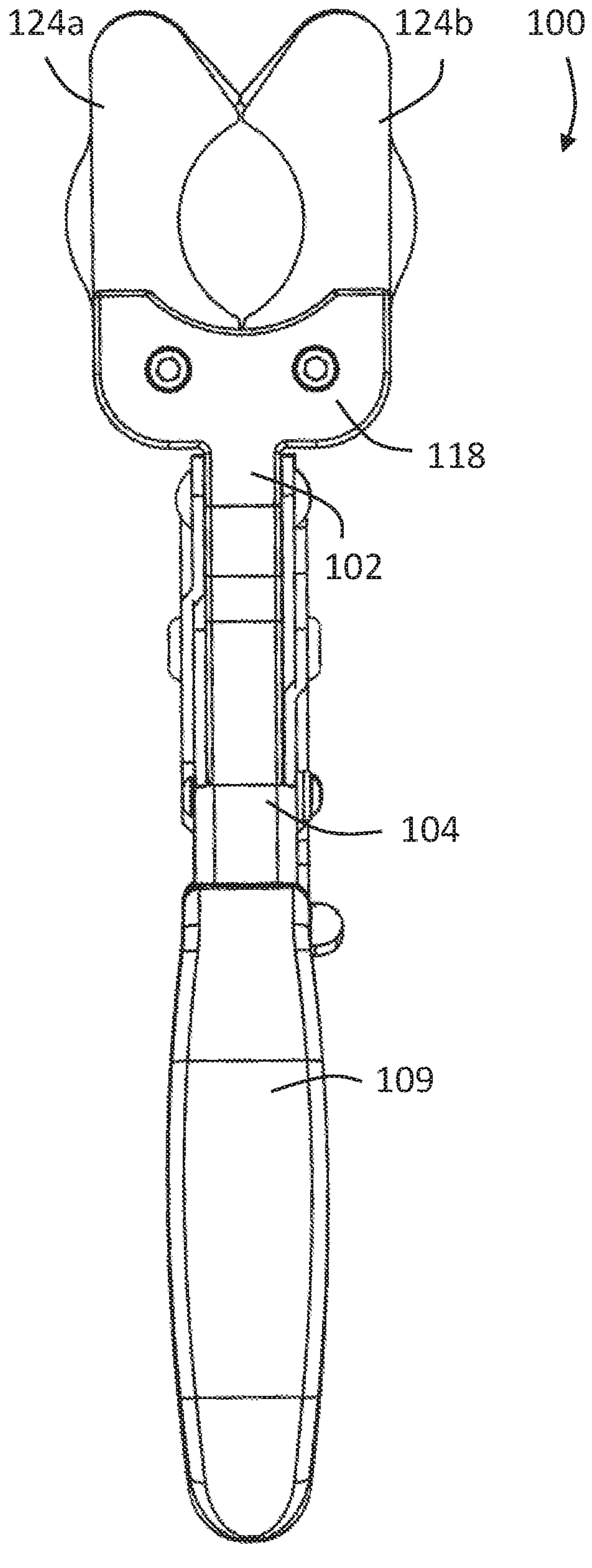
FIG. 5 is a second end view of the tool of FIG. 1.
Figure 6:
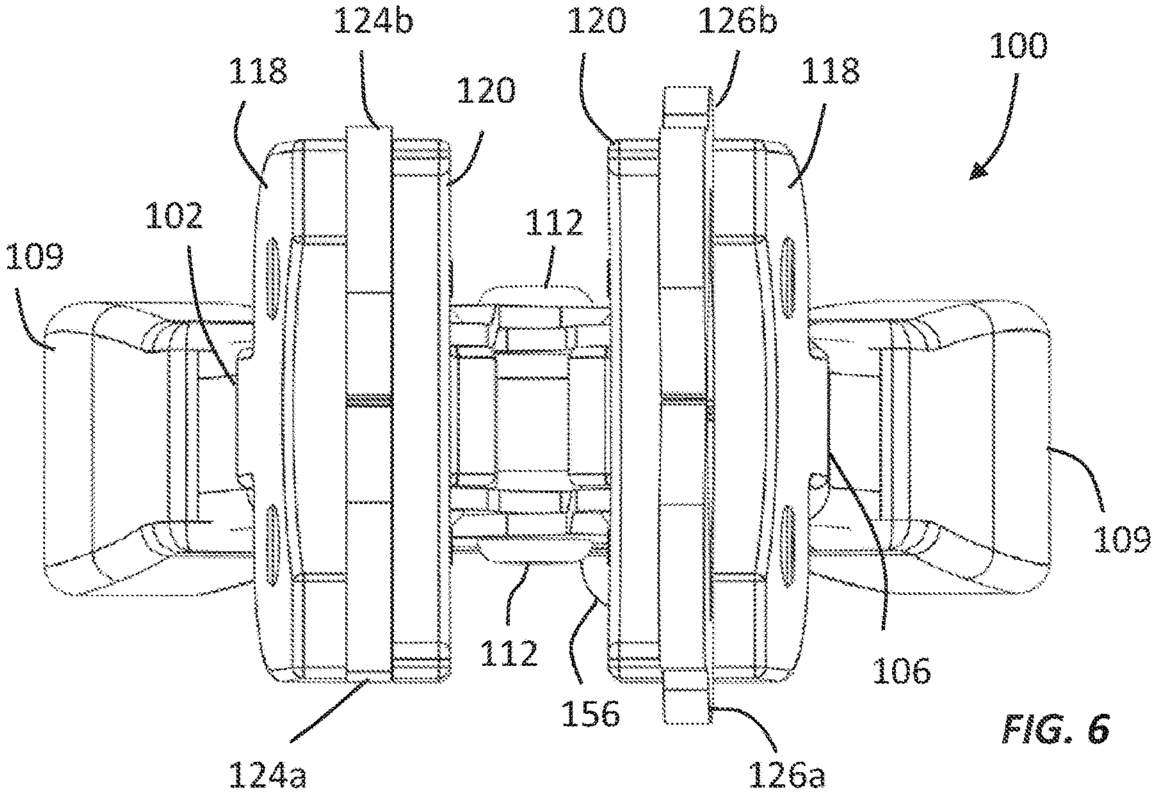
FIG. 6 is a top view of the tool of FIG. 1.
Figure 7:
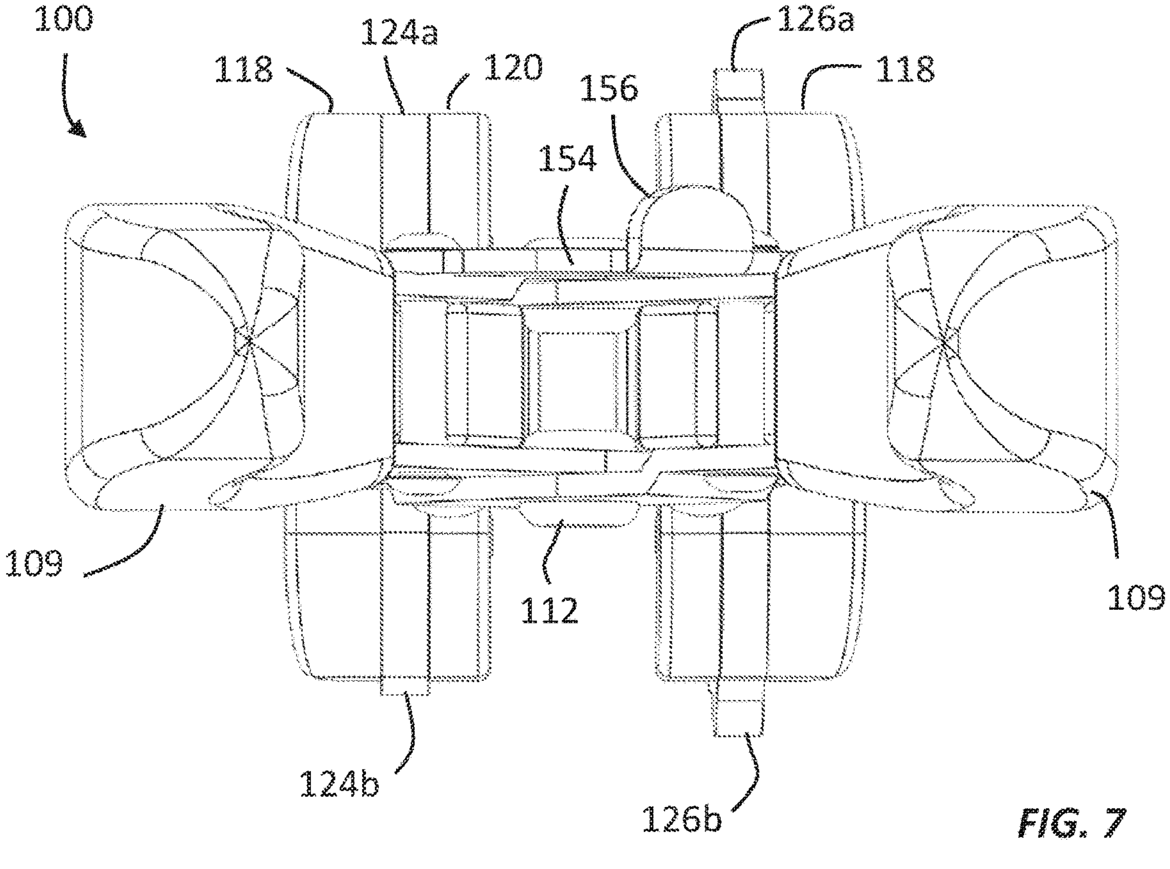
FIG. 7 is a bottom view of the tool of FIG. 1.
Figure 8:
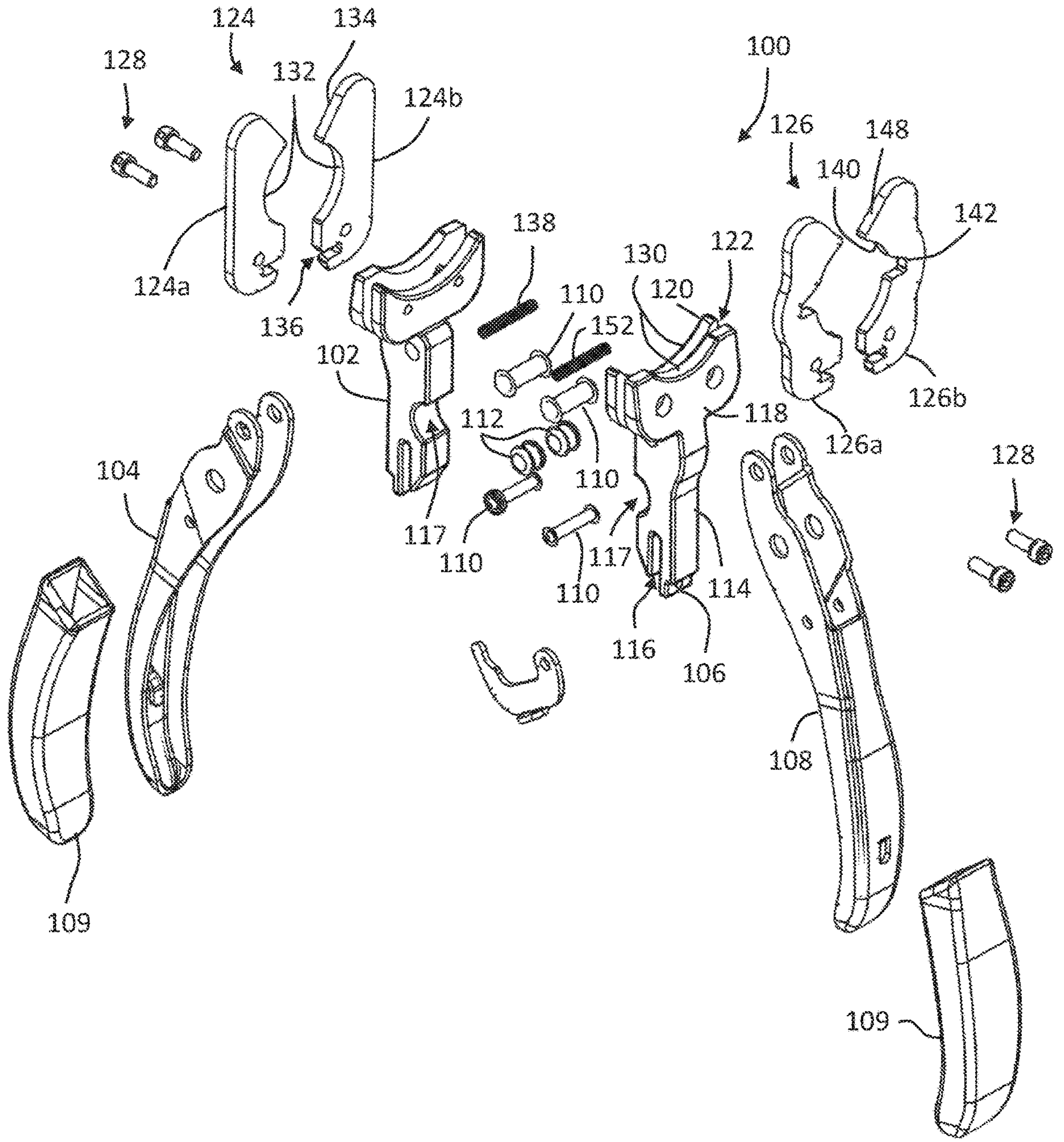
FIG. 8 is an unassembled view of the tool of FIG. 1.
Figure 9:
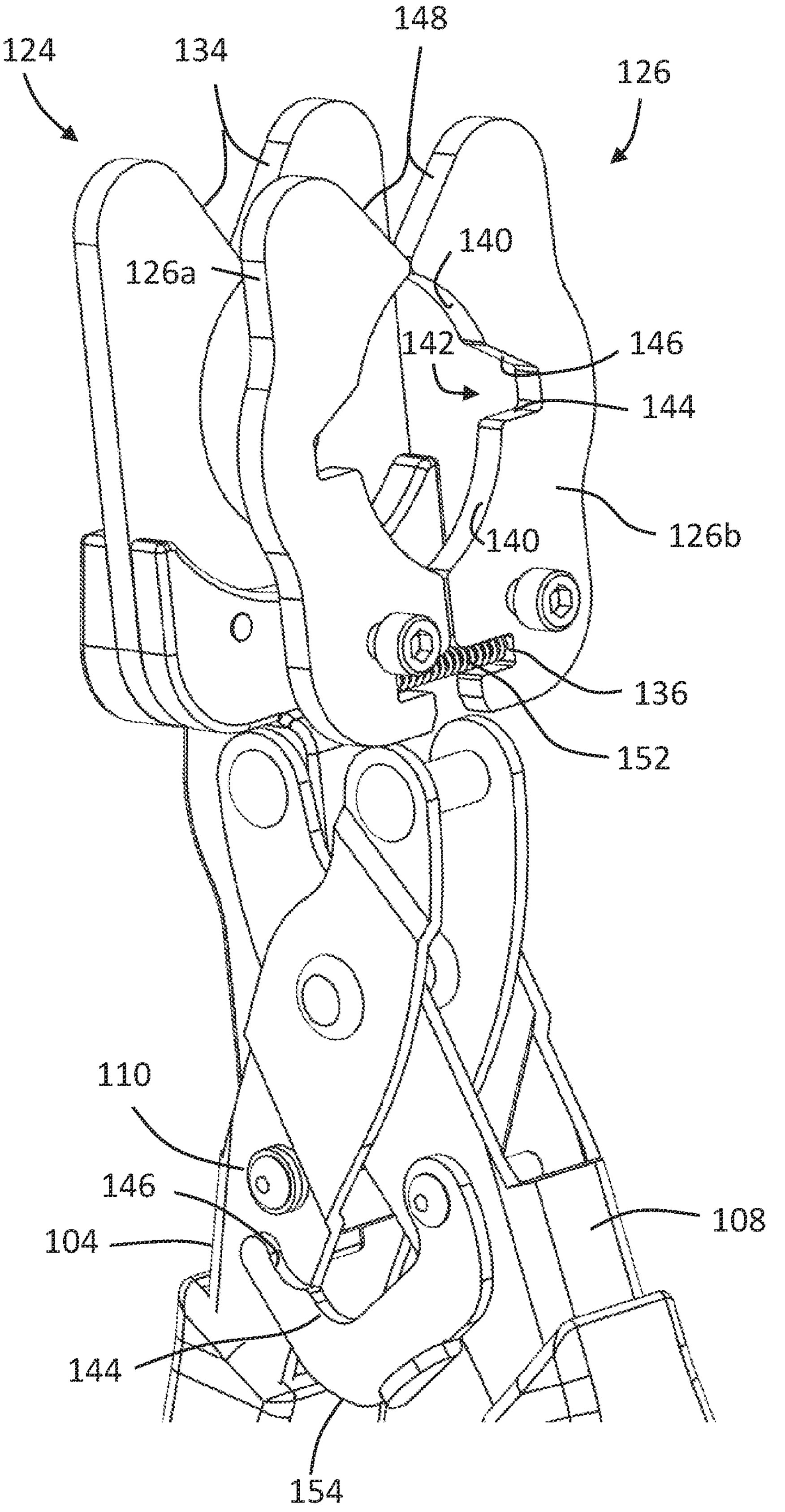
FIG. 9 is a perspective view of the tool of FIG. 1 with a first body member removed.
Figure 10:
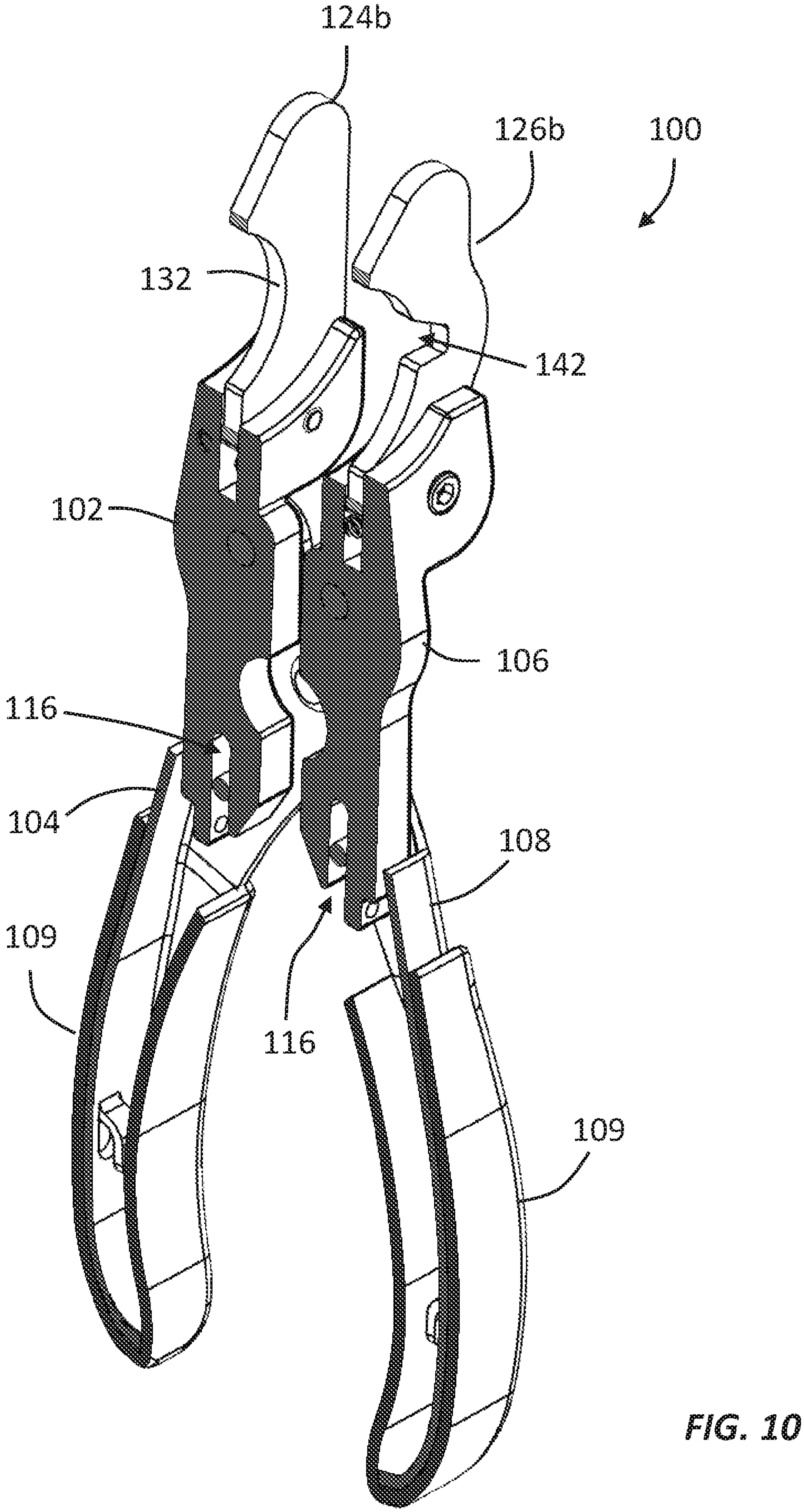
FIG. 10 is a perspective sectional view of the tool of FIG. 1.
Figure 11:
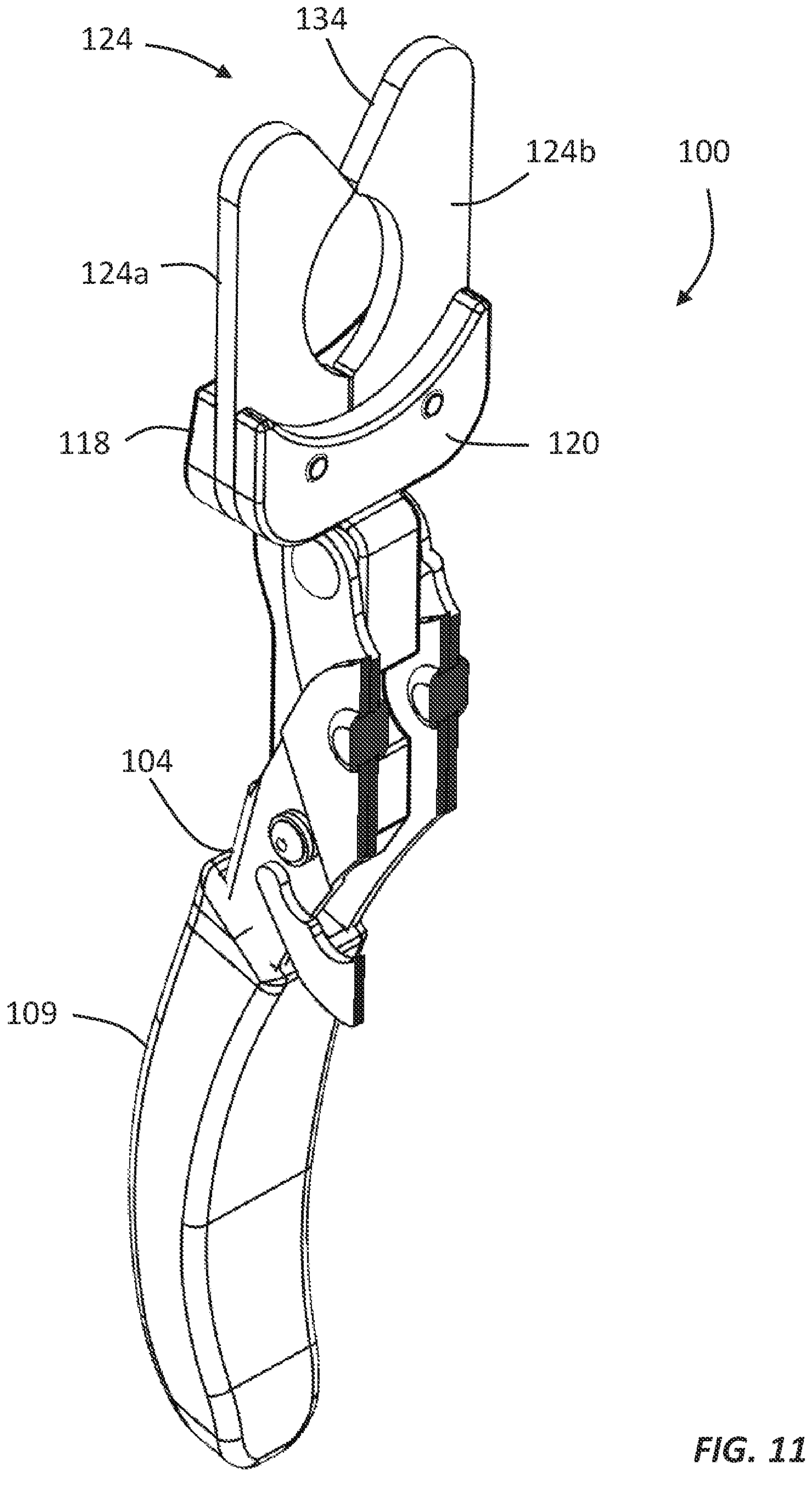
FIG. 11 is a perspective section view of the tool of FIG. 1.

The detailed description explains embodiments of the disclosure, together with advantages and features, by way of example with reference to the drawings.

DETAILED DESCRIPTION

Embodiments disclosed herein provide for a tool that allows for a disassembly of a push-to-connect fitting from a tube or pipe.

Referring to FIGS. 1-12, an embodiment is shown of a disassembly tool 100 that allows a pipe or tube to be removed from a push-to-connect fitting. The tool 100 includes a first jaw 102 that is connected to a first handle 104 and a second jaw 106 that is connected to a second handle 108. The jaws 102, 106 are coupled to the handles 104, 108 by pairs of rivets 110. The first handle 104 and second handle 108 are pivotally connected to each other by an axles or rivets 112. It should be appreciated that as the handles 104, 108 rotate relative to each other, the jaws 102, 106 also rotate relative to each other. In an embodiment, a cover 109 is disposed over a portion of the handles 104, 108.

In the illustrated embodiment, the first jaw 102 and second jaw 106 are identical and oriented 180 degrees relative to each other. Each jaw 102, 106 includes a body portion 114 having a slot 116 (FIG. 8) sized to receive one of the rivets 110. It should be appreciated that the slot 116 allows clearance for the rivet 110 to move as the handles 104, 108 are rotated. The body 114 further includes a semi-circular relief slot 117 that provides clearance for the rivets 112 when the handles 104, 108 are in the closed position. Extending from one end of the body 114 are a pair of members 118, 120 that define a slot 122 therebetween. The slot 122 is sized to receive a pair of fingers 124, 126. The members 118 each include a pair of openings that are axially aligned with threaded holes in members 120. The openings are sized to receive fasteners 128. The fasteners 128 couple the fingers 124, 126 within the slot 122. The end of the members 118, 120 includes a semi-circular recess or surface 130.

The pair of first fingers 124 includes a first finger 124*a* and a second finger 124*b* that are pivotally coupled to the slot 122 of the first jaw 102. Each finger 124*a*, 124*b* includes a semi-circular recess or surface 132 that are arranged opposite each other when coupled in the slot 122. The fingers 124*a*, 124*b* may further include a lead-in surface 134 that facilitates installation of the fingers 124 on the pipe or tubing as is discussed in more detail herein. The fingers 124*a*, 124*b* further include a slot 136 that is sized to receive a biasing member, such as compression spring 138. The spring 138 bias's the fingers 124 into a closed position. As discussed herein, the spring 138 allows the fingers 124 to accommodate a continuous range of pipes or fittings without requiring the use of adapters, inserts or reconfiguration by the user.

The pair of second fingers 126 are similar to the fingers 124 and include a first finger 126*a* and a second finger 126*b*. The fingers 126*a*, 126*b* each include a semi-circular surface 140. In the illustrated embodiment, the surface 140 is bifurcated by a slot 142. In the illustrated embodiment, the slot 142 includes a surface 144 (FIG. 9) that is generally perpendicular to a center plane extending longitudinally through the tool 100. The slot 142 further includes a second surface 146 disposed on an angle relative to the first surface 144. The slot 142 is sized to provide a relief or clearance for surfaces on the push-to-connect fitting to allow the surfaces 140 to engage the sides of the fitting. The fingers 126*a*, 126*b* also each have a lead-in surface 148 that facilitates installation of the fingers 126 onto the push-to-connect fitting. Similar to the fingers 124*a*, 124*b*, the fingers 126*a*, 128*b* each have a slot 150 sized to receive a biasing member, such as compression spring 152. The spring 152 biases the fingers 126*a*, 126*b* into a closed position. As discussed herein, the spring 152 allows the fingers 126 to accommodate a continuous range of pipes or fittings without requiring the use of adapters, inserts or reconfiguration by the user.

In an embodiment, pivotally coupled to one of the handles 104, 108 is a latch member 154. In an embodiment, the latch member 154 is a generally planar member that pivots about a rivet 110. The latch member 154 may include a projection 156 that extends outward from the center plane of the tool 100 and provides a surface to facilitate movement of the latch member 154, such as with the users finger for example. The latch member 154 includes a first engagement surface 158 and a second engagement surface 160. As will be discussed in more detail herein, the engagement surfaces cooperate with a rivet 110 on the other handle to hold the handles 104, 109, and thus the fingers 124, 126 in a fixed position as the pipe or tube is removed from the push-to-connect fitting.

Figure 12:
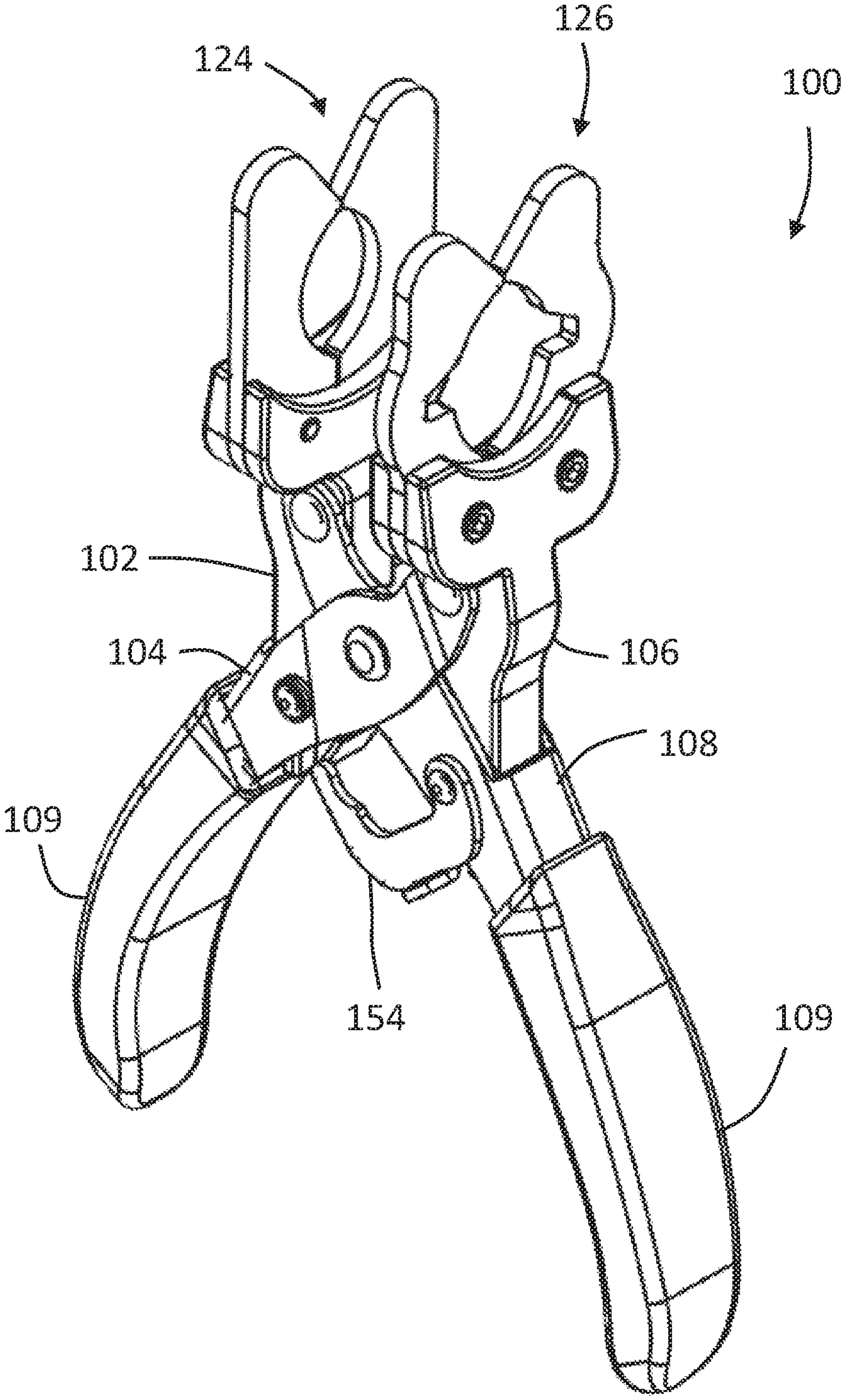
FIG. 12 is a perspective view of the tool of FIG. 1 in a second position.
Figure 13:
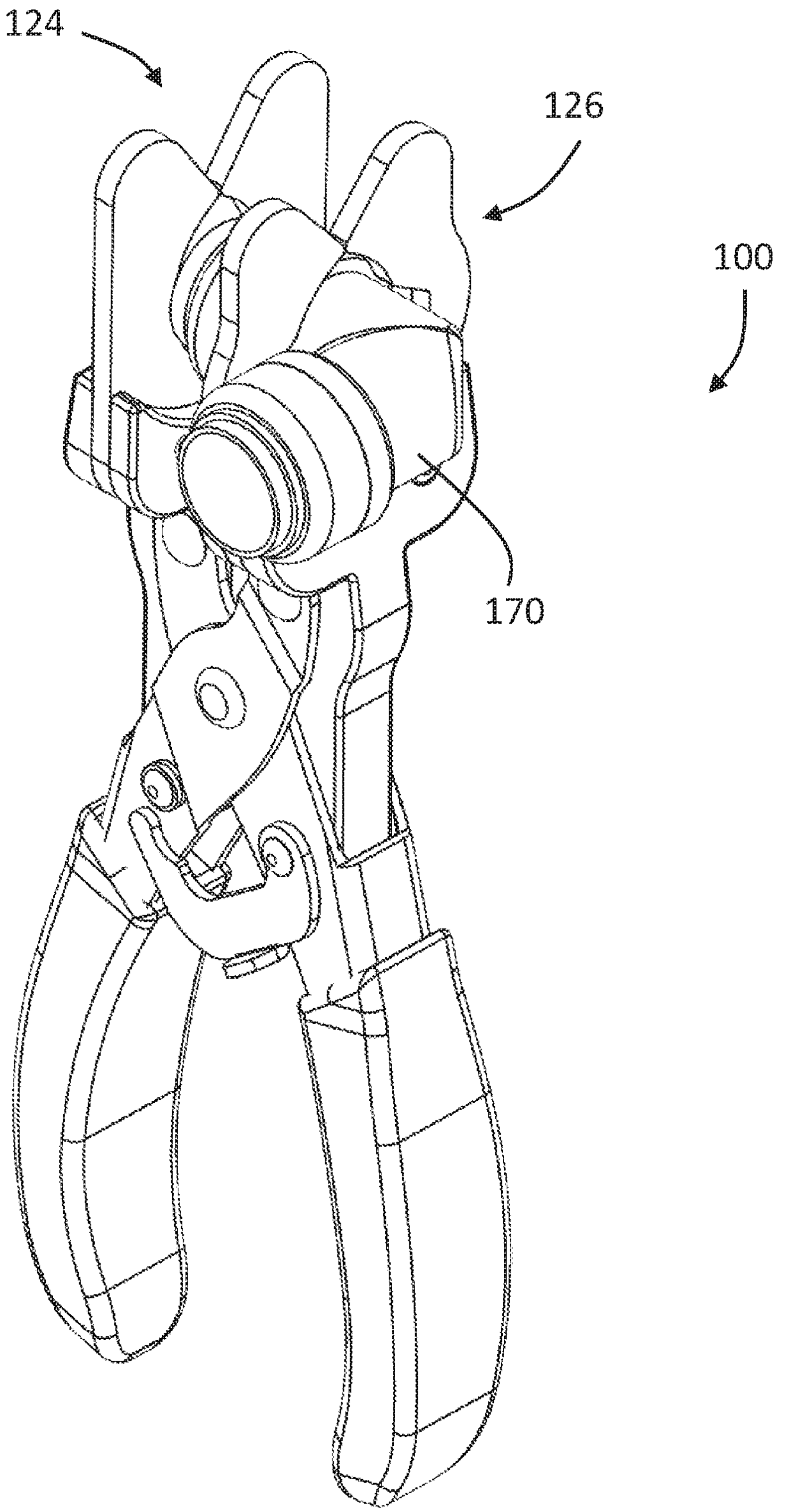
FIG. 13 is a perspective view of the tool of FIG. 1 connected to an elbow fitting.
Figure 14:
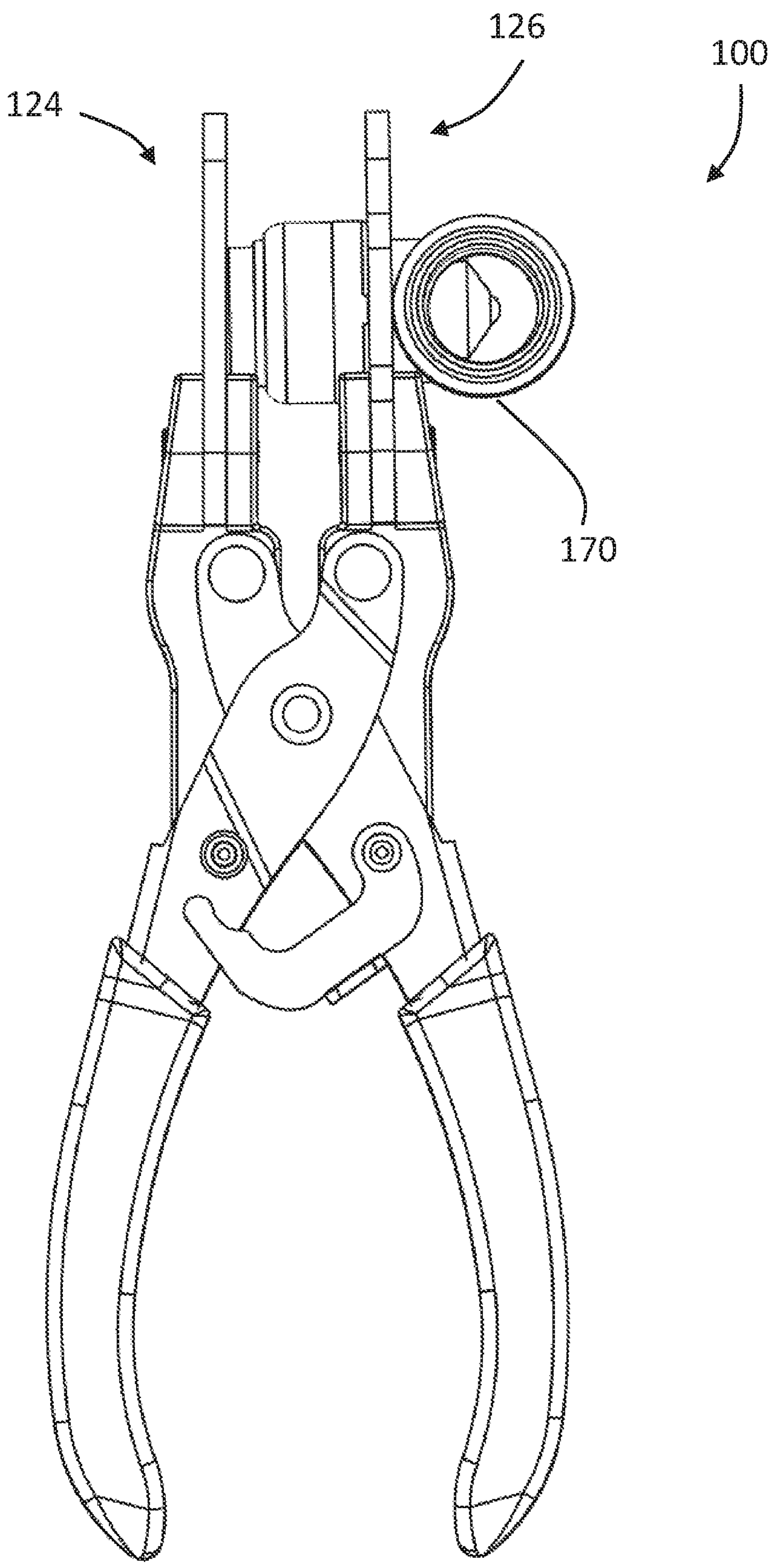
FIG. 14 is a side view of the tool of FIG. 13.
Figure 15:
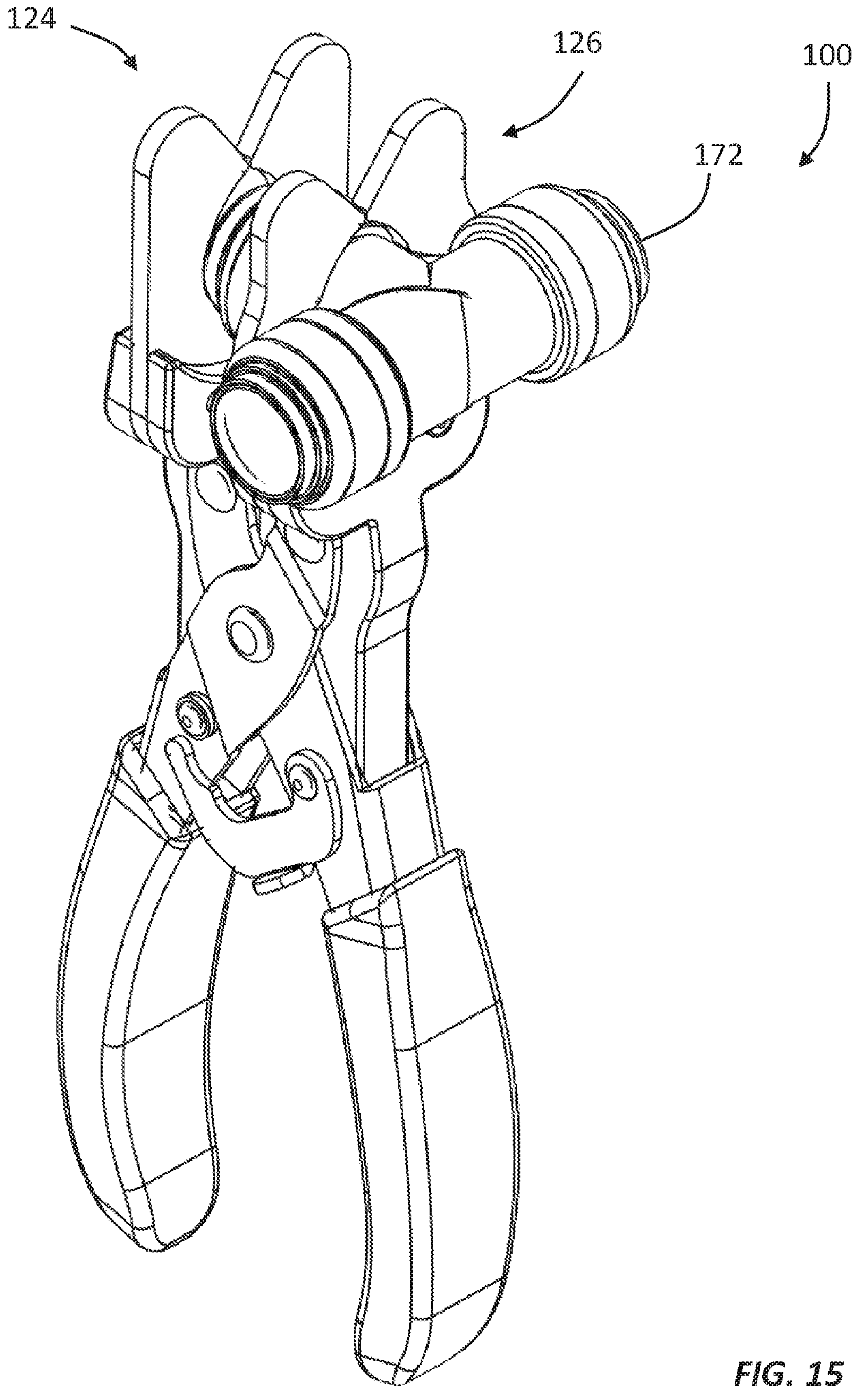
FIG. 15 is a perspective view of the tool of FIG. 1 connected to a T-fitting.
Figure 16:
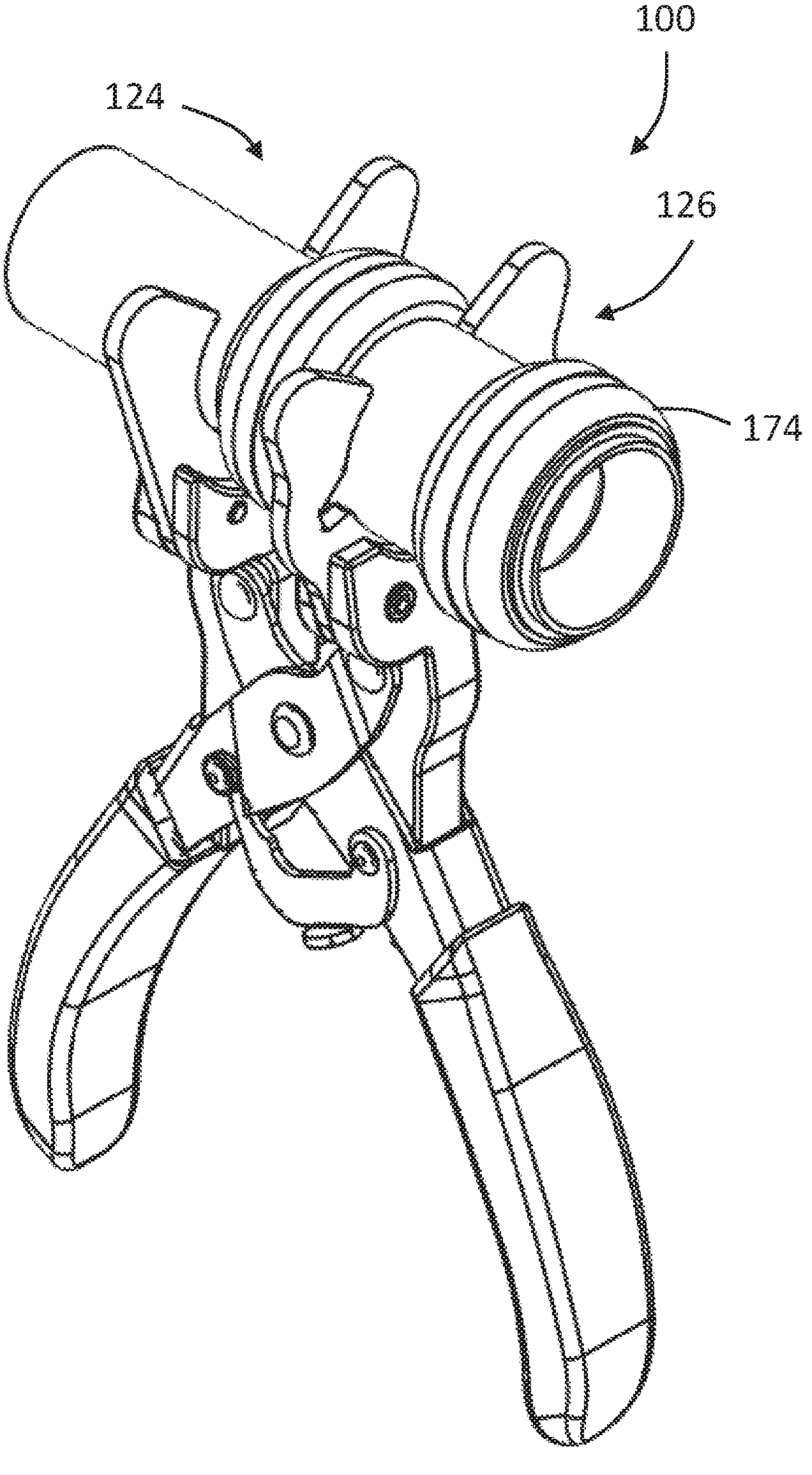
FIG. 16 is a perspective view of the tool of FIG. 1 connected to a connector fitting.
Figure 17:
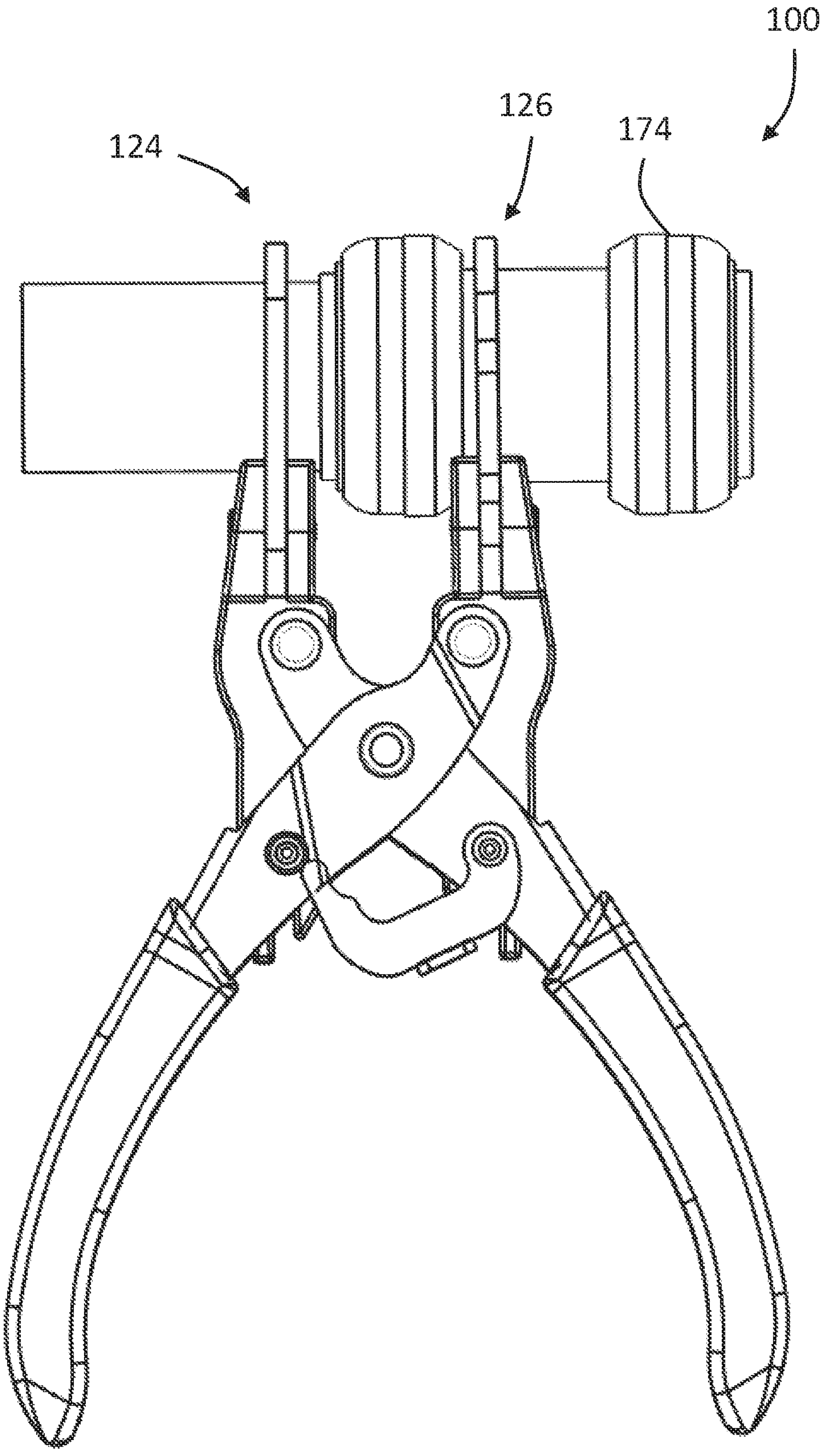
FIG. 17 is a side view of the tool of FIG. 1 of FIG. 16.

The tool 100 is movable from an open or first position shown in FIG. 12 to a second position shown in FIGS. 13-17. It should be appreciated that the second position will depend on the size fitting and pipe/tubing the tool 100 is being used on. One advantage of the tool 100 is that it can be used on different size fittings (based on pipe/tube diameter), such as but not limited to ½ inch, ¾ inch and 1 inch diameter pipe/tube, and on different type fittings, such as but not limited to in-line couplings 174 (FIG. 16-17), elbows 170 (FIG. 13-14) and t-fittings 172 (FIG. 15) for example.

Figure 18:
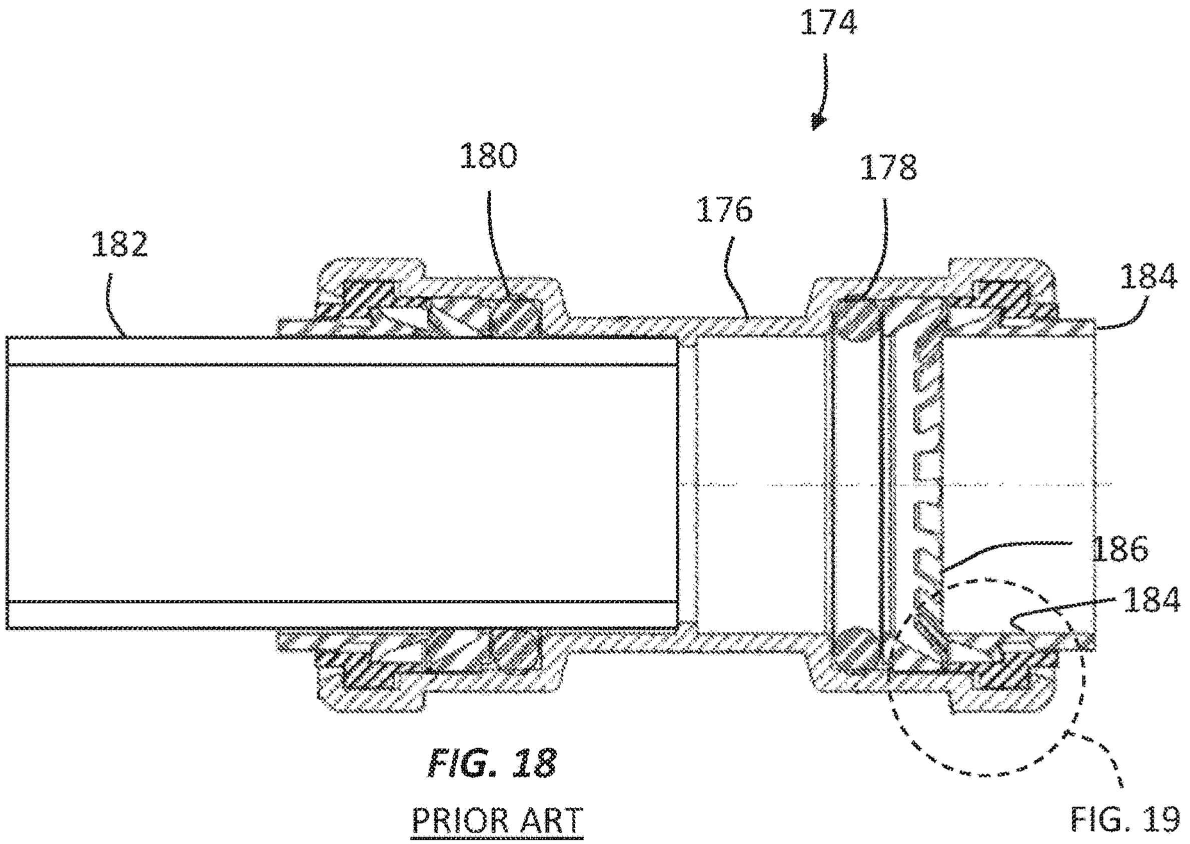
FIG. 18 PRIOR ART
FIG. 18 is a side sectional view of a push-to-connect fitting in accordance with an embodiment.
Figure 19:
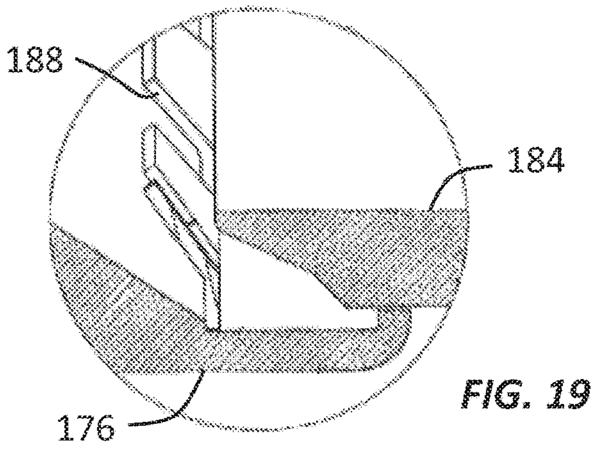
FIG. 19 PRIOR ART
FIG. 19 is an enlarged sectional view of a portion of the fitting of FIG. 18.
Figure 20:
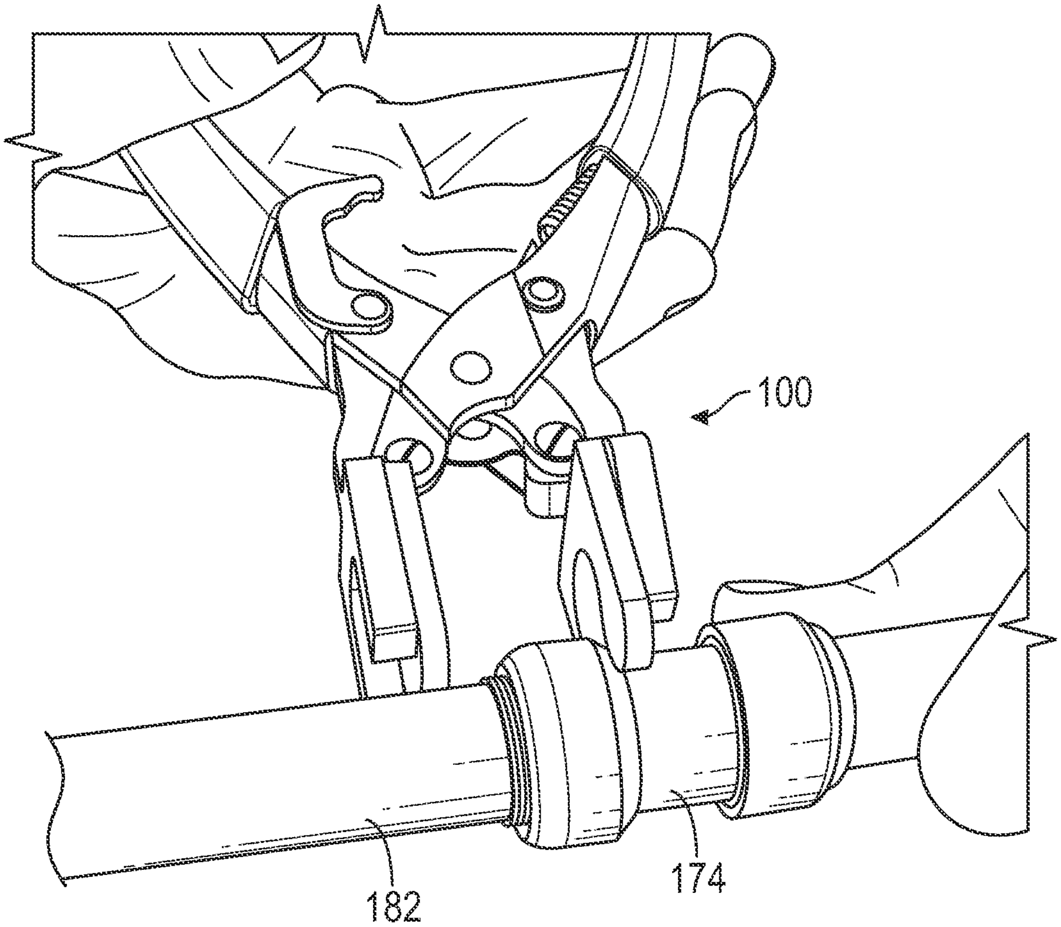
FIG. 20-25 illustrate a method of disassembling a push-to-connect fitting assembly.

Referring now to FIG. 18 and FIG. 19, an embodiment is shown of a prior art push-to-connect in-line coupling/fitting 174. The fitting 174 may be the same as is described in U.S. Pat. No. 10,180,202 entitled Push-to-connect Fitting with Release Assistance Assembly and Device, the contents of which are incorporated by reference herein. The fitting 174 includes a body 176 having an opening extending therethrough. O-rings 178, 180 provide a seal between the body 176 and the pipe/tubing 182. Within the ends of the opening are collars 184. The collar 184 has an opening sized to receive the pipe/tubing 182. Disposed adjacent the collar within the housing opening is a ring 186 having a plurality of teeth 188. The fitting 174 is configured such that when the pipe/tubing 182 is pushed into the collar 184, the piping/tube 182 slides past the teeth 188 and the o-rings 178. The o-rings 178 seal against the pipe/tubing 182 and due to the angle of the teeth 188, the piping/tubing 182 cannot be pulled out. It should be appreciated that while embodiments herein describe the fitting 174 as having teeth 188, this is for example reasons and the claims should not be so limited. In other embodiments, the tool 100 may be used on fittings having a collar, but no teeth structure.

Figure 21:
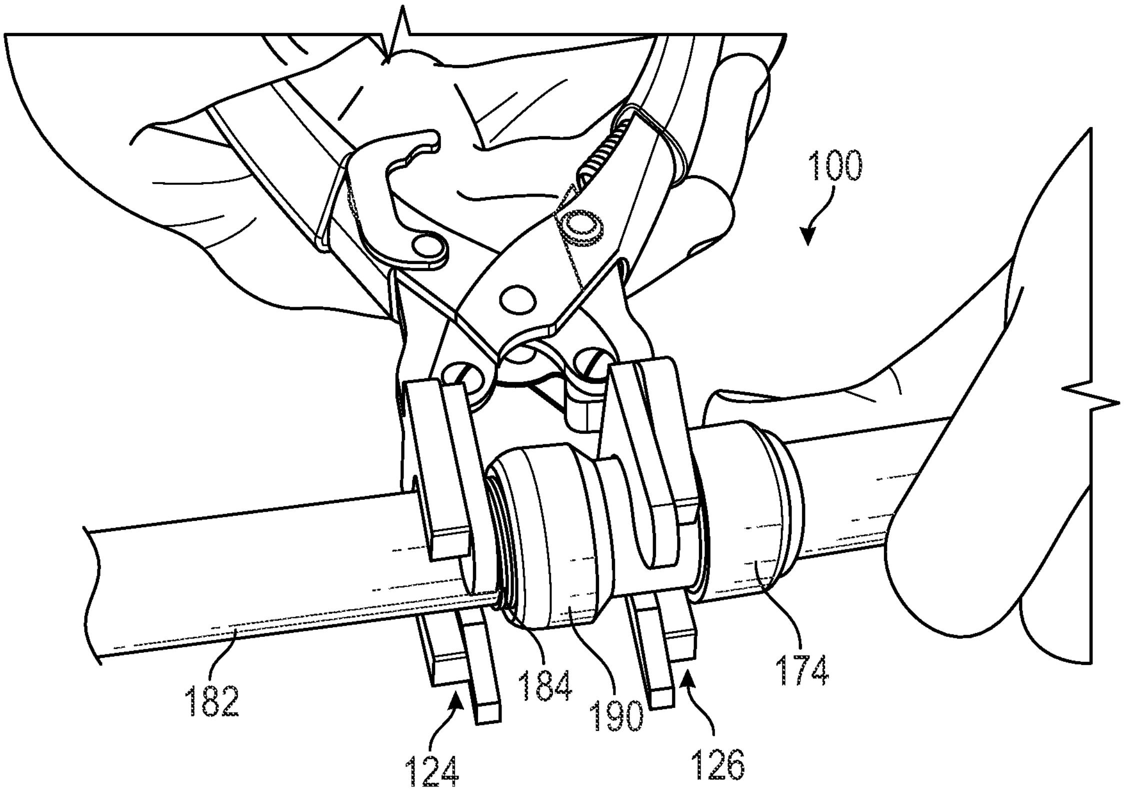

It should be appreciated that in some instances, the user may desire to disassembly the pipe/tubing 182 from the fitting 174. Referring now to FIGS. 20-25 with continuing reference to FIG. 18-19, the operation of the tool 100 to disassemble a pipe/tubing 182 from a push-to-connect fitting 174 is shown and described. The method starts with the user moving the tool to the open position (FIG. 12) and placing the lead-in surfaces 134, 148 against the pipe/tubing 182 and the fitting 174 (FIG. 20), the user presses the tool 100 against the pipe and fitting. As the tool 100 is pressed against the pipe and fitting, the force on the lead-in surfaces 134, 148 overcomes the bias of the springs 138, 152 causing the lead-in surfaces 134, 148 of each of the fingers 124, 126 to separate and slide around the pipe/tubing 182 and fitting 174 (FIG. 21). At this point, the inner surface of the fingers 124 are apart from the edge of the collar 184 and the fingers 126 may be apart from the flange 190 on the fitting 174.

Figure 22:
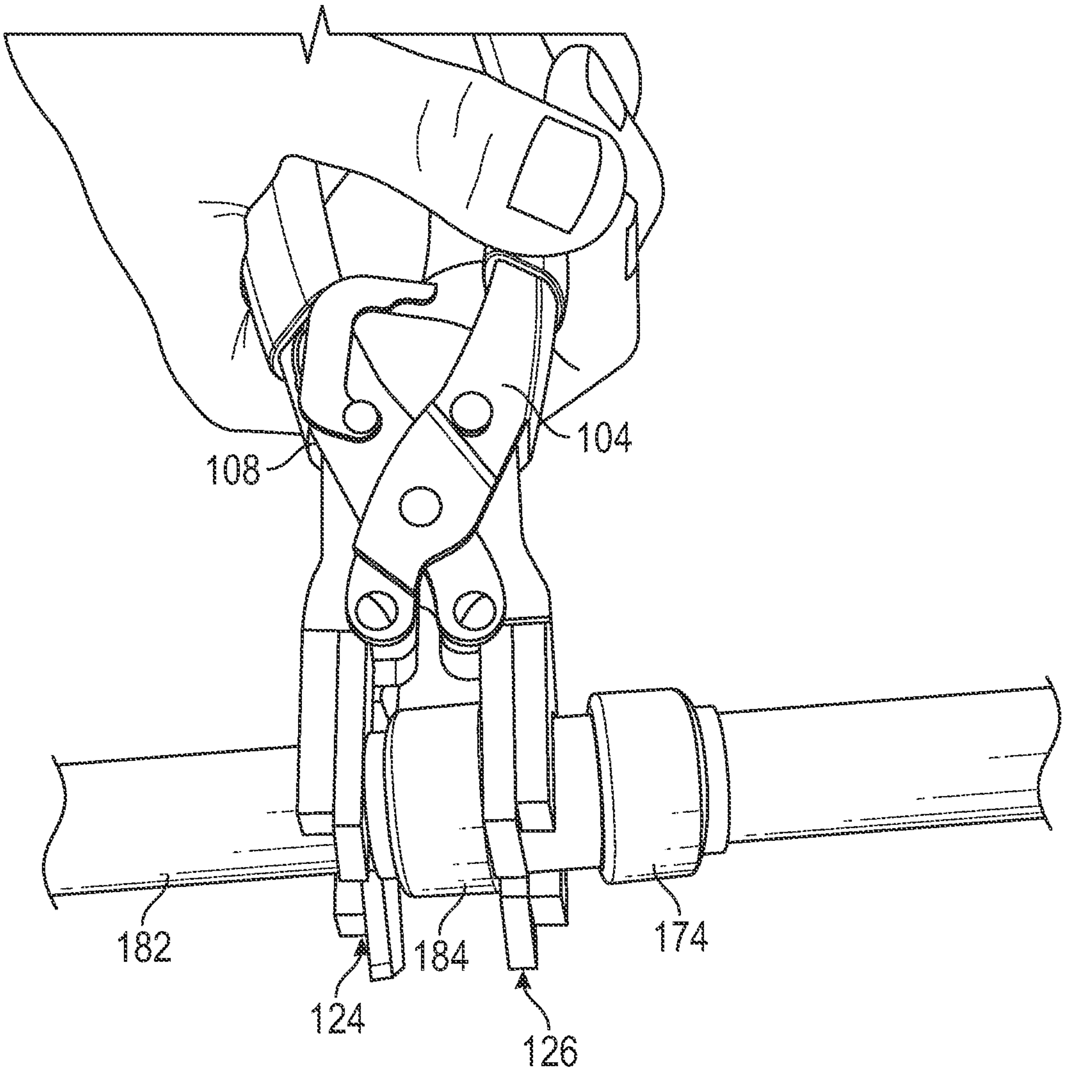

The user then squeezes the handles 104, 108 causing the fingers 124, 126 to move towards each other, causing the fingers 124 to engage the collar 184 and the fingers 126 to engage the flange 190 (FIG. 22). The continued squeezing of the handles 104, 108 causes the collar 184 to slide coaxially about the pipe/tubing 182 to engage the teeth 188 (FIG. 19) of the ring 186. As the collar 184 continues to slide, the teeth 188 deflect and disengage from pipe/tubing 182. In an embodiment, the surfaces 130 may be placed in contact with the pipe/tubing 182 and the fitting 174.

Figure 23:
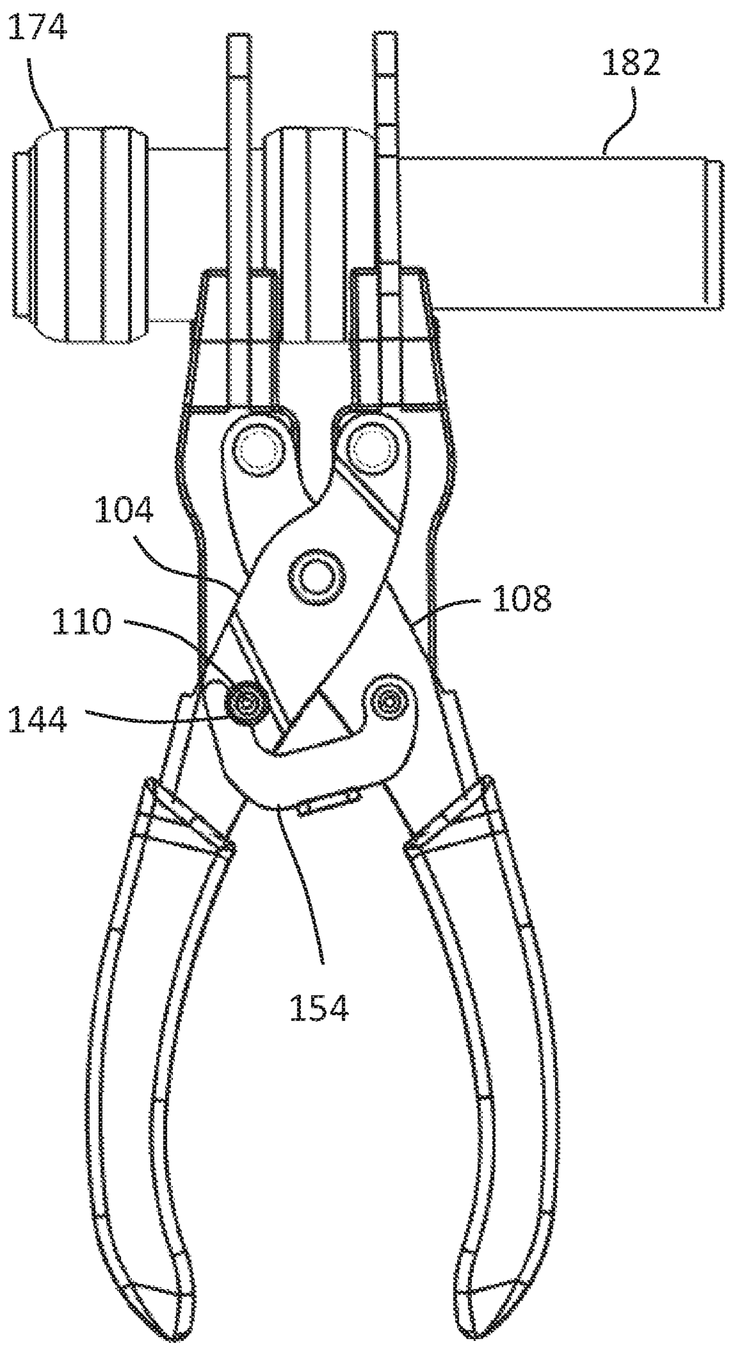

To hold the collar 184 in a position with the teeth 188 disengaged, the user rotates the latch member 154 to engage one of the engagement surfaces 158, 160 with the rivet 110 (FIG. 23). It should be appreciated that the engagement surface that is coupled to the rivet 110 may depend on which size fitting is being disassembled. It should further be appreciated that the pivoting configuration of the fingers 124, 126 and the two engagement surfaces of the latch member 154 provide advantages in allowing the tool 100 to be used with a variety of sizes and types of fittings.

Figure 24:
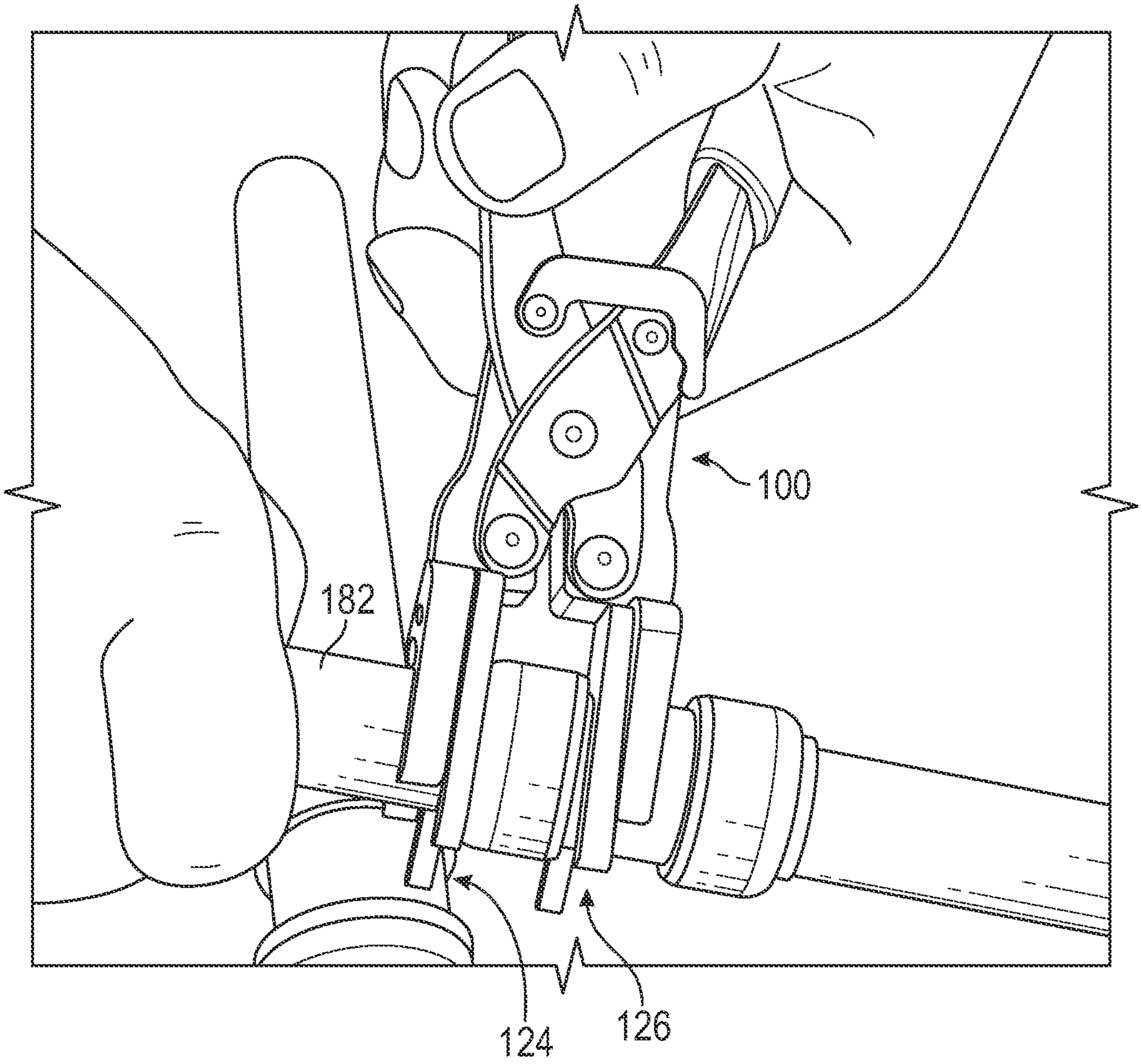
Figure 25:
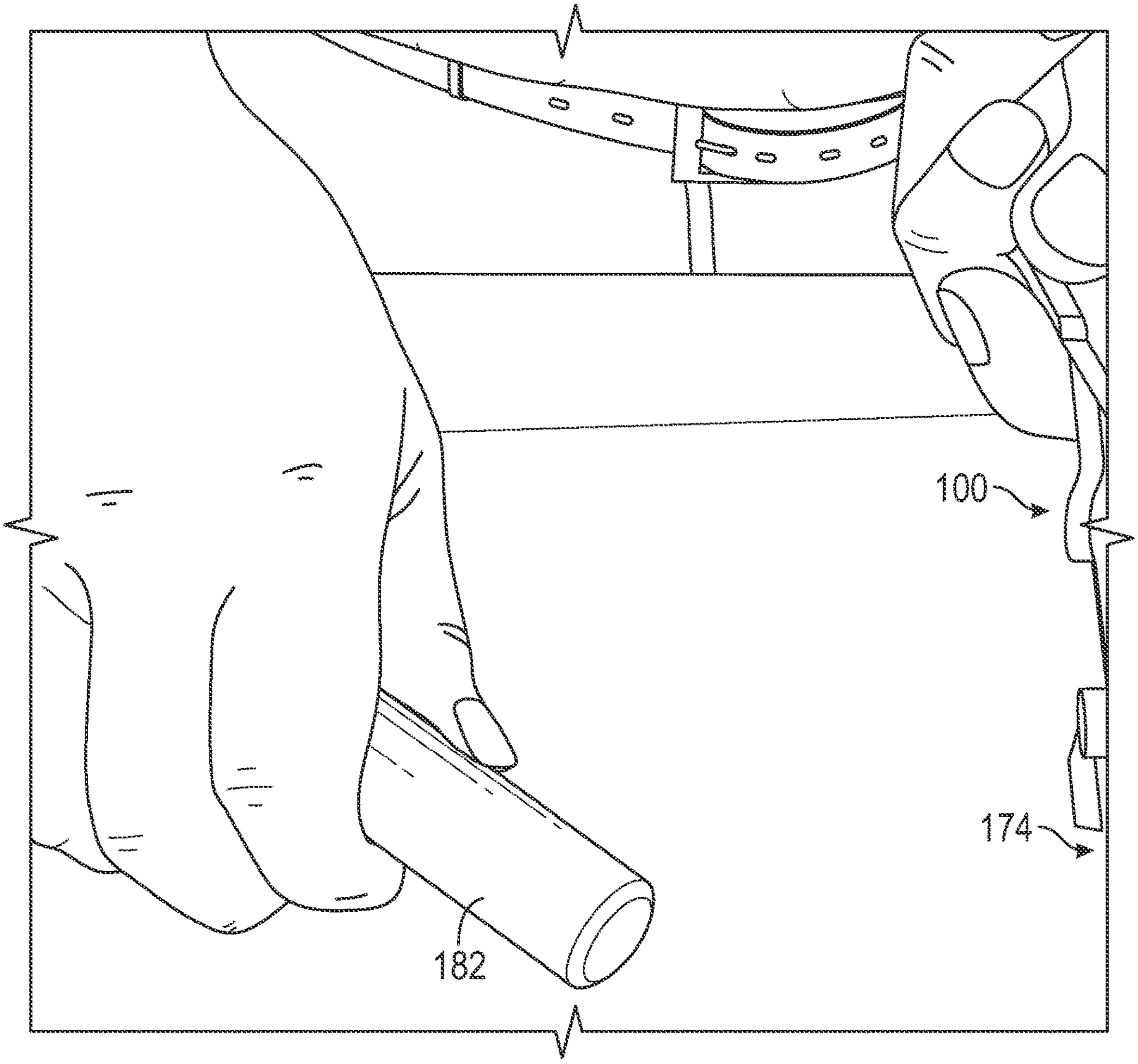

With the teeth 188 disengaged from the pipe/tubing 182, the user may then grasp the pipe/tubing 182 in one hand and hold the fitting with the tool 100 (FIG. 24). By twisting and pulling the pipe/tubing 182, the user can separate the pipe/tubing 182 from the fitting 174 (FIG. 25). Once the pipe/tubing 182 is separated, the user may disconnect the latch member 154 allowing the tool 100 to be removed from the fitting 174. In an embodiment, the collar 184 will slide axially within the fitting 174, allowing the teeth 188 to deflect back to the original position. In some embodiments, the fittings 174 may be reused by simply pushing the end of the piping/tubing 182 back into the fitting 174.

It should be appreciated that the while the embodiment herein describes the operation of the tool 100 with an in-line fitting 174, this is for example purposes and the claims should not be so limited. The tool 100 may be used with any push-to-connect type fitting without needing adapters, inserts, or other reconfiguration of the tool. The tool 100 can be used with fittings such as but not limited to elbows, t-fittings, and in-line fittings, and with fittings of any size. The tool can also accommodate fittings and pipes in a continuous range of sizes (e.g. ½ to 1 inch continuously).

It should be appreciated that while embodiments herein may describe the use of the tool 100 in reference to plumbing, this is for example purposes and the claims should not be so limited. In other embodiments, the tool may used in application where pipes, conduits, channels, tubes or the like that are connected by a push-to-connect fitting having a collar regardless of the application. In other embodiments, the tool 100 may be used to disassembly fittings on electrical conduits for example.

Technical effects and benefits of some embodiments include providing a tool that allows for rapid and easy disassembly of push-to-connect type fittings from pipes or tubing without having to change or reconfigure the tool.

The term “about” is intended to include the degree of error associated with measurement of the particular quantity based upon the equipment available at the time of filing the application. The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A tool for disassembling a pipe or tube from a push-to-connect fitting having a collar arranged to engage the pipe or the tube, the tool comprising:

a first body;

a second body pivotally coupled to the first body;

a pair of first fingers pivotally coupled to the first body, each of the first fingers having a first semi-circular surface, the first semi-circular surfaces cooperating to engage the pipe or the tube adjacent the collar; and a pair of second fingers coupled to the second body, each of the second fingers having a second semicircular surface, the second semicircular surfaces cooperating to engage the push to connect fitting;

wherein when the first body is rotated from a first position to a second position, the pair of first fingers moves the collar axially relative to the pipe or the tube; and wherein each of the second semi-circular surfaces includes a slot extending therefrom, each of the slots being arranged opposite each other.

2. The tool of claim 1, further comprising a latch member pivotally coupled to one of the first body or the second body, the latch member having a first engagement surface and a second engagement surface, the latch member being movable to selectively engage the first engagement surface or the second engagement surface.

3. The tool of claim 1, wherein the pair of first fingers are coupled by a first biasing member, the first biasing member biasing the first semi-circular surfaces toward each other.

4. The tool of claim 3, wherein the pair of second fingers are coupled by a second biasing member, the second biasing member biasing the second semi-circular surfaces toward each other.

5. The tool of claim 1, further comprising a first handle coupled to the first body and a second handle coupled to the second body.

6. The tool of claim 1, wherein the first body includes a third semi-circular surface, the third semi-circular surface being adjacent to and perpendicular to the first semi-circular surfaces.

7. The tool of claim 6, wherein the second body includes a fourth semi-circular surface, the fourth semi-circular surface being adjacent to and perpendicular to the second semi-circular surfaces.

8. A method of disassembling a pipe or tube from a push-to-connect fitting, the push-to-connect fitting having a collar arranged to engage the pipe or the tube, the method comprising:

moving a tool to a first position, the tool having a first body, a second body pivotally coupled to the first body, a pair of first fingers coupled to the first body and a pair of second fingers coupled to the second body;

engaging the pair of first fingers with the pipe or the tube;

engaging the second pair of fingers with the push-to-connect fitting;

pivoting the first body relative to the second body to engage the collar with the first fingers;

pivoting the first body relative to the second body to slide the collar axially into the push-to-connect fitting;

removing the pipe or the tube from the push-to-connect fitting when the collar is slid axially into the push-to-connect fitting;

fixing a position of the first body relative to the second body prior to removing the pipe or the tube from the push-to-connect fitting;

wherein the fixing of the position is provided by a latching member pivotally coupled to the second body;

wherein the latching member includes a first engagement surface and a second engagement surface; and pivoting the latching member to operably engage the first engagement surface with the first body when a first fitting is coupled to the pipe or the tube, and pivoting the latching member to operably engage the second engagement surface with the first body when a second fitting is coupled to the pipe or the tube, the first fitting being a different size than the second fitting.

9. The method of claim 8, further comprising biasing the first fingers against the pipe or the tube, and biasing the second fingers against the push-to-connect fitting.

10. A method of disassembling a pipe or tube from a push-to-connect fitting, the push-to-connect fitting having a collar arranged to engage the pipe or the tube, the method comprising:

moving a tool to a first position, the tool having a first body, a second body pivotally coupled to the first body, a pair of the first fingers coupled to the first body and a pair of second fingers coupled to the second body;

engaging the pair of first fingers with the pipe or the tube;

engaging the second pair of fingers with the fitting;

pivoting the first body relative to the second body to engage the collar with the first fingers;

pivoting the first body relative to the second body to slide the collar axially into the fitting; and removing the pipe or the tube from the fitting when the collar is slid axially into the fitting;

wherein each of the second fingers has a semicircular surface, the semicircular surfaces cooperating to engage the push-to-connect fitting; and wherein each of the semi-circular surfaces includes a slot extending therefrom, each of the slots being arranged opposite each other.

11. The method of claim 10, further comprising biasing the first fingers against the pipe or the tube, and biasing the second fingers against the fitting.

12. The method of claim 10, further comprising fixing a position of the first body relative to the second body prior to removing the pipe or the tube from the fitting.

13. The method of claim 12, wherein the fixing of the position is provided by a latching member pivotally coupled to the second body.

14. The method of claim 13, wherein the latching member includes a first engagement surface and a second engagement surface.

15. The method of claim 14, further comprising pivoting the latching member to operably engage the first engagement surface with the first body when a first fitting is coupled to the pipe or the tube, and pivoting the latching member to operably engage the second engagement surface with the first body when a second fitting is coupled to the pipe or the tube, the first fitting being a different size than the second fitting.

* * * * *